(12) United States Patent
Smith et al.

(10) Patent No.: US 7,644,103 B2
(45) Date of Patent: Jan. 5, 2010

(54) MEDIADESCRIPTION DATA STRUCTURES FOR CARRYING DESCRIPTIVE CONTENT METADATA AND CONTENT ACQUISITION DATA IN MULTIMEDIA SYSTEMS

(75) Inventors: Geoffrey R Smith, Mountain View, CA (US); Kevin T. Carle, Mountain View, CA (US); Michael A. Cleron, Menlo Park, CA (US); Samuel Thomas Scott, III, Los Gatos, CA (US); Victor S. Lee, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 11/042,480

(22) Filed: Jan. 25, 2005

(65) Prior Publication Data

US 2006/0167903 A1 Jul. 27, 2006

(51) Int. Cl.
*G06F 7/00* (2006.01)
*H04N 7/173* (2006.01)

(52) U.S. Cl. .................. 707/104.1; 725/87; 725/93; 725/131

(58) Field of Classification Search ............... 707/104.1
See application file for complete search history.

(56) References Cited

U.S. PATENT DOCUMENTS

| | | | | |
|---|---|---|---|---|
| 5,751,280 | A * | 5/1998 | Abbott et al. | 707/104.1 |
| 5,774,666 | A * | 6/1998 | Portuesi | 725/37 |
| 5,931,908 | A * | 8/1999 | Gerba et al. | 707/104.1 |
| 5,982,445 | A * | 11/1999 | Eyer et al. | 725/104 |
| 6,240,183 | B1 * | 5/2001 | Marchant | 380/28 |
| 6,643,650 | B1 * | 11/2003 | Slaughter et al. | 707/104.1 |
| 7,103,905 | B2 * | 9/2006 | Novak | 725/46 |
| 2002/0007493 | A1 * | 1/2002 | Butler et al. | 725/109 |
| 2004/0078293 | A1 | 4/2004 | Iverson et al. | |
| 2004/0210845 | A1 * | 10/2004 | Paul et al. | 715/731 |

OTHER PUBLICATIONS

"Broadcast and On-line Services: Search, select, and rightful use of content on personal storage systems (TV-Anytime Phase 1); Part 2: System description, European Broadcasting Union Draft ETSI TS 102 822-2", ETSI Standards, European Telecommunications Standard Institute, Sophia-Antipo, FR, vol. BC, No. V121, Jul. 2004, p. 9-12 and p. 21-36.
Leban, M., "Internet Search for TV Content Based on TV Anytime", EUROCON 2003. Computer as a Tool. The IEEE Region 8 Sep. 22-24, 2003, pp. 70-73.
The TV-Anytime Forum: "Requirements Series: R-3 On: Metadata Requirements", Internet Article: Apr. 7, 2000-Jul. 7, 2000, pp. 8-22.

* cited by examiner

*Primary Examiner*—Vincent Boccio
(74) *Attorney, Agent, or Firm*—Lee & Hayes, PLLC

(57) ABSTRACT

A MediaDescription data structure that includes both descriptive metadata, such as EPG information, about a multimedia content item and instructions for acquiring the content item is assigned to each multimedia content item in a multimedia system. A MediaDescription data structure is transferable as a token for representing the content item. The acquisition information may also include information about presenting the content item in different view contexts, as well as information about relationships to other pieces of content, and information about how each different version of the content item is to be acquired and displayed. MediaDescription data structure tokens can be used to facilitate digital video recording (DVR) processes, Internet content rendering processes, multimedia search processes, search results aggregating processes, video-on-demand (VOD) processes, pay-per-view processes, and program guide rendering processes.

20 Claims, 18 Drawing Sheets

MEDIADESCRIPTION DATA STRUCTURES FOR CARRYING DESCRIPTIVE CONTENT METADATA AND CONTENT ACQUISITION DATA IN MULTIMEDIA SYSTEMS

TECHNICAL FIELD

The subject matter described herein relates generally to multimedia systems and more specifically to MediaDescription data structures for carrying descriptive content metadata and content acquisition data in multimedia systems.

BACKGROUND

In a multimedia system, the device presenting content to an end-user must be provided with a technique for determining which services are available, and how to present individual services when they are selected. In the early days of television, the list of available services was predefined; there were twelve bands on which television signals could be communicated, and the client could select any one of them. Metadata about content actually being carried on the channels was delivered "out of band," in the form of newspaper listings or television guide magazines. A similar set-up applied to radio broadcasts.

As television migrated to digital delivery, content-delivery techniques became more complicated, as multiple services could be multiplexed within an individual band. When MPEG transport streams were invented, the designers included an information standard for grouping and selecting content from a multiplexed stream, known as "system information" or simply SI. The MPEG SI describes which audio stream and video streams to combine to create a service, and indicates to the client where each can be discovered. Still, metadata describing the content actually being displayed on a particular service at a particular time was delivered out of band. Even contemporary on-screen electronic program guides get their data from out of band sources.

Another example of a standard designed to carry acquisition information is the digital video broadcasting (DVB) family of standards, which describe a system for carrying MPEG transport streams over the air or from satellite. Although these forms of MPEG SI are extremely useful for describing the contents and properties of an MPEG transport stream, they are not capable of carrying information about more general types of content (web pages, flash animations, and so on).

The first generation of digital media devices had to be constructed with specialized hardware, because it was simply not cost-effective to use a general-purpose computer to perform multimedia tasks. As a result, set top boxes were generally designed to target a particular mode of data delivery and a particular type of data content. For example, the first generation of the MOTOROLA DCT family of cable set top boxes was originally designed to exclusively display analog and MPEG video content. Similarly, the original generation of digital satellite receivers simply consumed MPEG transport streams from a satellite and displayed them. Both of these types of devices had extra user interfaces (UIs) for displaying guide metadata and offering pay-per-view content, but there was no provision for a more universal, general schema to direct content of different service types to the box, because at the time there was no way to make use of other types of content besides analog and MPEG video.

Some current multimedia systems use Internet protocols to distribute data. The number of different types of data which can potentially be acquired by the client is limited only by the capacity of the client to acquire, recognize, and properly process the content. Beyond just being able to decode different types of content (for example, MICROSOFT® WINDOWS® media versus MPEG media), some of the systems can use multimedia content delivered in various different manners (for example, WINDOWS® streaming media carrying live channels; WINDOWS® media carried in on-demand servers for providing movies; media played back from a local, attached hard drive, etc.). This flexibility requires a different system from the ones used in a conventional unidirectional approach.

Another aspect of using Internet protocols to distribute multimedia data is that individual end-users may contribute data to the network (e.g., upload content or send content horizontally to end-user peers) in addition to simply consuming programs in a downstream direction from the commercial service provider. In a model similar to those described above, if the Smiths create their own slide-show, digital music, or home movie and wish to deliver it to their friends for consumption on their home multimedia display system, the Smiths would be required to provide SI data to the central service provider, which would then be re-distributed from the central provider to the friends. This is inefficient and non-user-friendly, and there is no vehicle for associating metadata with the uploaded content so that end-recipients can see a description before playing the content. That is, the traditional metadata distribution techniques are also centralized and unidirectional, and typically focused on delivering descriptions of on-demand movies and live television content. Consumers are increasingly able to produce and host their own content for delivery to fellow consumers. Additionally, a whole universe of third-party commercial content providers vie to provide content to consumers. A way is needed to signal metadata and transfer acquisition information so that content from many diverse sources can be integrated into a unified user experience that does not rely on centralized distribution, or on being embedded with a particular media stream.

SUMMARY

A MediaDescription is a data structure associated with a multimedia content item that includes both descriptive metadata (i.e., user-legible metadata, for instance, EPG listings) about the content item and instructions for acquiring the content item. A MediaDescription data structure is transferable as a token, enabling recipients of the MediaDescription data structure to access the EPG information and the acquisition information.

The acquisition information may include service collection information about presenting the content item in different view contexts, as well as information about relationships to other pieces of content, and information about how each different version of the content item is to be acquired and displayed.

MediaDescription data structure tokens can be used to facilitate digital video recording (DVR) processes, Internet content rendering processes, multimedia search processes, video-on-demand (VOD) processes, pay-per-view processes, and program guide rendering processes, and aggregating processes for search results.

DETAILED DESCRIPTION

Overview

Figure 1:
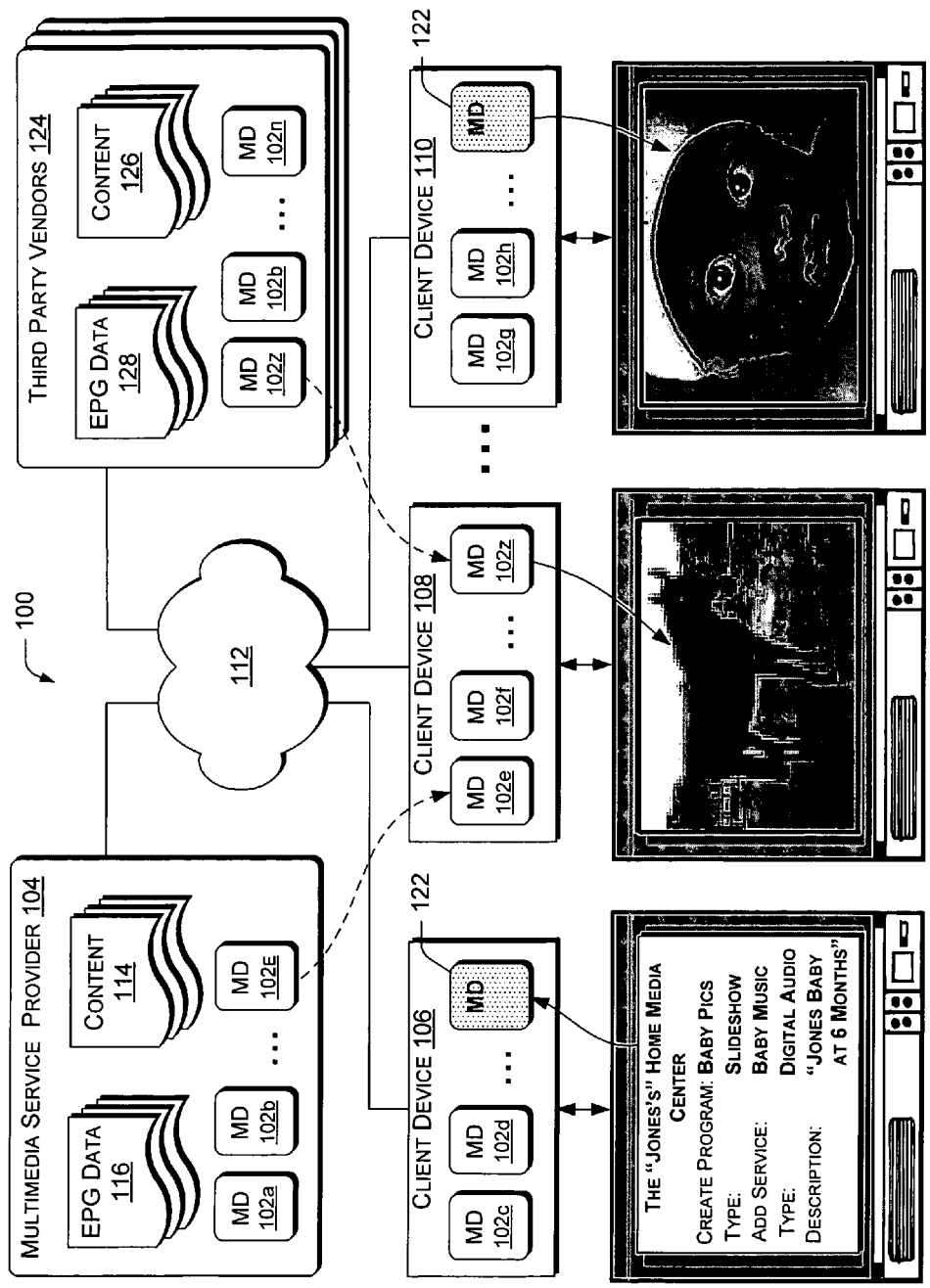
FIG. 1 is a diagrammatic representation of an exemplary multimedia system that uses MediaDescription data structures.

In an exemplary multimedia system 100 as shown in FIG. 1, a "MediaDescription" 102 is a token that provides at least two pieces of information about each multimedia "content item" in the multimedia system 100. A content item can be a program or a program segment. First, a MediaDescription 102 provides a description of the content item, and second, provides acquisition information for obtaining the content item. The descriptive aspect of a MediaDescription 102 can usually be integrated immediately into an electronic program guide (EPG) in the multimedia system 100, while the acquisitive aspect of a MediaDescription 102 can usually be executed by a client device to readily obtain the content. MediaDescriptions 102 provide a universal language for the components of an exemplary multimedia system 100. It should be noted here that the "descriptive metadata" that a MediaDescription 102 can carry or refer to may be EPG data (including, for example, suggested price) and/or may be other user-legible metadata, program guide information, etc.

One important feature of MediaDescriptions 102 is that the aforementioned acquisition data is not limited to certain media types. Hence, a MediaDescription 102 can inform a client device how to acquire a commercial TV program, digital music, a slideshow from an Internet uniform resource locator (URL), a still JPEG image, homemade videos, etc., and simultaneous combinations thereof. Likewise, the descriptive data is also not limited to "canned" commercial EPG data. That is, the format of a MediaDescription 102 can be amenable to EPG data that has been created outside of usual commercial service provider sources.

MediaDescriptions 102, then, are typically brief, elemental data structures, each an agent associated with its given piece of multimedia content. Each MediaDescription 102 can be used as a "building-block" or token for describing and obtaining its associated program or segment, as mentioned. A MediaDescription 102 is a "dual-nature" token and in some implementations can often have additional natures too. Thus, MediaDescriptions 102 provide a new schema for provisioning service information (SI) to client devices that is more open-ended and able to deal with present and future proliferation of service types.

In another (or the same) implementation, instead of containing actual descriptive EPG data and acquisition data, some MediaDescriptions 102 can be cast in a compressed form to point outside themselves to EPG and acquisition data via identifiers, such as numbers, strings, or globally unique identifier (GUIDs). MediaDescriptions 102 can also refer to each other. The fact that each MediaDescription 102 is digitally reproducible, digitally transferable, and can autonomously carry EPG and acquisition data for a single piece of content has far-reaching implications. As one example, a MediaDescription 102 can allow smooth display of arbitrary content from the Internet throughout the UI of a client device 106 in a manner that is integrated with commercial channels received from a service provider 104.

MediaDescriptions 102 can also result in a dramatic decrease in network traffic. An exemplary multimedia system 100 that uses MediaDescriptions 102 can be saved from either trying to send all possible data to all customers by default, or requiring clients to access multiple servers on a network (e.g., EPG, SI, and security servers) every time a new content item is to be delivered. Using MediaDescriptions 102, not every content item to be displayed on a client device 106 has to be known to servers of an exemplary multimedia system 100.

MediaDescriptions 102 have additional implications for exemplary models that use them. Video-on-demand, content bill payment applications, and many other activities and functions of a multimedia system occur with additional features and flexibility that are not possible with conventional multimedia systems that do not have the benefit of a MediaDescription infrastructure.

Exemplary Multimedia System

In the exemplary multimedia system 100 shown in FIG. 1, a multimedia service provider 104 provides commercial multimedia content to customers. Each customer typically controls a client device (e.g., 106, 108, 110). The service provider 104 may send content digitally over the Internet 112 or over another transfer medium.

The service provider 104 fashions programming from a store of programs or channels 114 (the content) and from related EPG data 116. For each individual program or channel to be offered to consumers, the associated EPG data and acquisition data can be formatted into a MediaDescription 102. Descriptive metadata and acquisition data that are ubiquitously recognized across the multimedia system 100, or at least reused many times across clients, can be stored somewhere on the multimedia system 100 and pointed to by identifiers, as described above. MediaDescriptions 102 in a compressed format may be composed partially, or entirely, of these identifiers. Thus, a compressed MediaDescription 102 may include identifiers instead of explicit EPG data and/or explicit acquisition data. For example, such a compressed form of a MediaDescription 102b may be all GUIDs. In compressed form, the information associated with a MediaDescription 102b does not have to be in a prevailing formal language structure (e.g., XML) as long as it is obtainable in a form the client device can use. On the other hand, descriptive metadata and acquisition data can always be included in an explicit manner in a MediaDescription 102, i.e., the use of identifiers is flexible or optional.

MediaDescriptions 102 and/or their various parts can also be "named" or "anonymous." A named MediaDescription 102 (or named part) provides a feature that the name is unique across an entire multimedia system, that is, the name given to the named content is unique across the system. Names are known as "media descriptors." If the MediaDescription is anonymous, then there is no need for an associated media descriptor. Additionally, for internal purposes, an individual client may choose to give temporary names to anonymous MediaDescriptions, just for the purposes of internal management. But, because these temporary names are not universal throughout the system, their respective MediaDescriptions are not "named" MediaDescriptions.

Unlike conventional multimedia distribution techniques, a consumer in the exemplary multimedia system 100 can also create a MediaDescription, e.g., the shown MediaDescription 122. In one implementation, a new MediaDescription 122 is created each time a consumer creates their own content that is capable of entering the exemplary multimedia system 100. Accordingly, a MediaDescription 102 is created each time a digital video recording (DVR) occurs.

For example, if the Jones's, who control client device 106 decide to send baby pictures to the Smith's via an exemplary multimedia system 100, the Jones's can create a MediaDescription 122 that describes for its holder a slide-show 118 (or other media type) available, for example, from the Jones's Internet web page. In one implementation, the Jones's create descriptive material for the slide-show 118 and also select digital music 120, available on a music channel, e.g., as provided by the multimedia service provider 104 to accompany presentation of the slides. The music channel provider could be an Internet radio station. They then can encapsulate the URL, the descriptive material, and information for acquiring the music channel into a MediaDescription 122 of the musical baby slideshow. (The "URL" could be a real URL, or could just be a named entity for slideshow music.) The MediaDescription 122 can be digitally reproduced for distribution to whomever they please.

In comparison to the description of the Jones's creation of their own MediaDescription 122 just provided, a conventional commercial content provider often welds EPG data to individual programs or content streams and provides the programming/EPG to consumers in a monolithic, unidirectional, and inflexible manner. Conventional programming usually comprises one or a limited number of service types, and there is no vehicle—much less, a universal vehicle—for transferring multimedia content and metadata from one consumer to another, except perhaps by first uploading these to the central service provider. Thus, there is no cross-sharing of content between end-users.

MediaDescriptions 102, on the other hand, can be swapped horizontally between peers. If it is not important that one or more of the contents of a MediaDescription 102 be uniquely named across an entire multimedia system then an "anonymous" or unnamed MediaDescription 102 can be used. For example, aggregated search results may be sent to multiple downstream customers, but none of them need to match up with one another, so there is no point in naming them. An anonymous MediaDescription 102 typically includes explicit content metadata and explicit acquisition data, i.e., implicit identifiers for these data are usually not used, but can be. Thus, for example, when the content is exchanged between two private entities, an anonymous MediaDescription 102 may often be used. The Jones's can directly send the Smiths, who own client device 110, an anonymous MediaDescription 122 of the baby slide-show via the exemplary multimedia system 100 without having to transact with the multimedia service provider 104 or other entities in the system for which it would matter that a name of the Jones's MediaDescription refers to the baby slide-show content.

When the Jones's hand the Smith's their newly created MediaDescription 122, the Smith's client device 110 integrates a new channel into the Smith's program guide that has the baby slideshow, the music, and the description that the Jones's have composed. The content and EPG data are integrated into the Smith's lineup in a manner that is indistinguishable from other channels provided by a commercial service provider 104.

FIG. 1 also depicts numerous third party commercial service providers (e.g., independent commercial and/or Internet vendors) 124. Each third party provider 124 has content 126 and descriptive metadata, such as EPG data 128, represented by MediaDescriptions, e.g., 102z. When a consumer purchases a particular content 126 from the third party vendor 124, the vendor 124 can transfer a MediaDescription 102z to the consumer's client device 108. The MediaDescription 102z from the third party vendor 124 is indistinguishable from other MediaDescriptions 102e received from a regular service provider 104. Likewise, the descriptive metadata 128 of the third party MediaDescription 102z as well as a channel for display of its content 126, are integrated into the consumer's program guide and user experience in a seamless manner.

Map Structure for Exemplary Multimedia System

Figure 2:
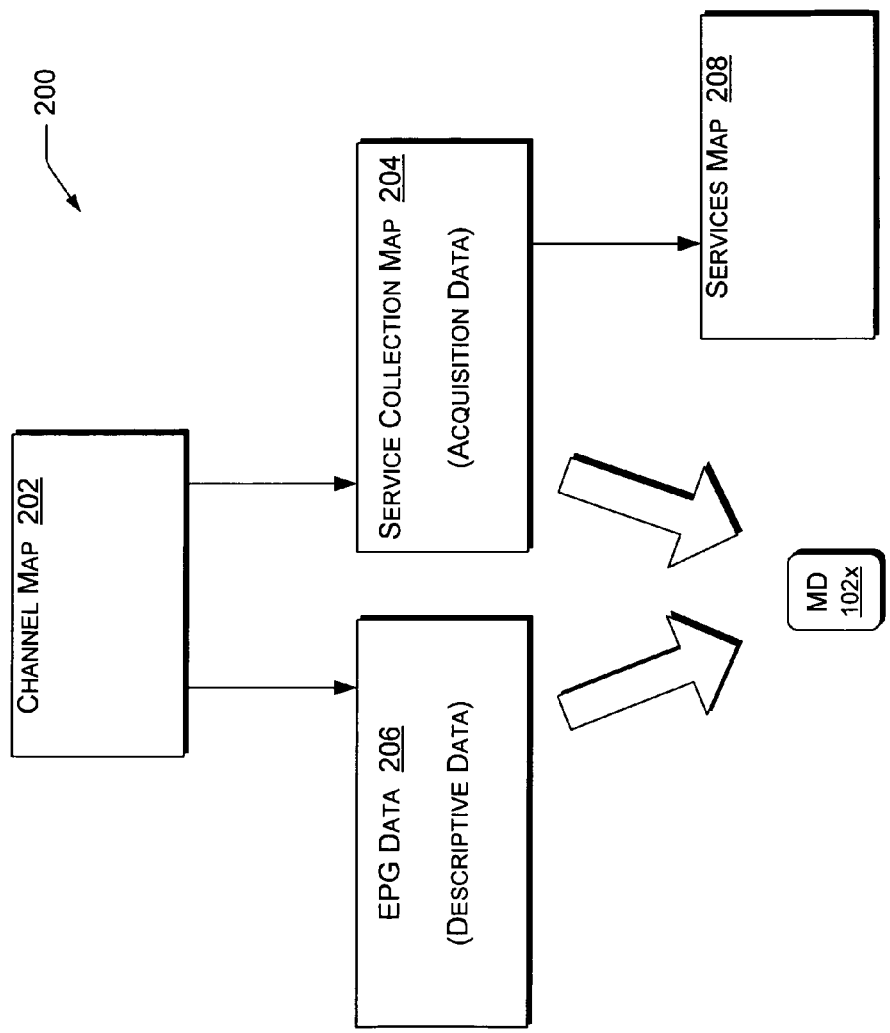
FIG. 2 is a block diagram of an exemplary service information map structure.

FIG. 2 shows an exemplary service information (SI) map structure 200 that provides one example of how information can be organized in an exemplary multimedia system 100 that uses MediaDescriptions 102. The example SI map structure 200 is provided in order to show how MediaDescriptions 102 relate to a system data structure. The internal data structure of MediaDescriptions 102 will be discussed further below.

In one implementation, an exemplary channel map 202 effects or at least exemplifies a fundamental beneficial separation in the exemplary multimedia system 100 between EPG data and acquisition data for obtaining program content. Conventionally, EPG data is often awkwardly welded to a single content stream. In one implementation of a MediaDescriptions model, however, an exemplary channel map 202 relates an identifier for a channel number to an identifier for acquisition data and an identifier for associated EPG data. One of the identifiers, of course, can be updated without changing the others, affording new flexibility. The identifiers then point to acquisition data 204 and to EPG data 206 respectively. This individual mapping of EPG data 206 and acquisition data 204 allows the exemplary multimedia system 100 to perform some new functions.

In one implementation, the acquisition data 204 includes a service collection map, as described in and is related to commonly assigned co-pending U.S. Patent application No. 11/013,303, to Smith et aL, entitled "Mixed-Media Service Collections For Multimedia Platforms," "Retry Strategies for Use in a Streaming Environment", filed on Dec. 15, 2004, which is incorporated herein by reference in its entirety.

A "service collection," as described herein and in the above-cited patent application can be, and typically is, a dynamic bundle of services that can be of different service types, i.e., video, audio, slideshow, jpeg, etc., and combinations thereof. A service collection can be accessed by being associated with a conventional channel number, or can be accessed in a number of different ways. For example, a video-on-demand (VOD) storefront might allow a consumer to access a service collection directly through a button on a remote controller. The various services of the same or different media types in a service collection are used and combined depending on the current conditions at a given client device, according to pre-established display contexts. Thus, a client may receive one rendition of the requested programming content if the client possesses one set of conditions, such as one type of hardware, display resolution, and level of authorization to view the content, but may receive another rendition of the programming content under a different set of client conditions, such as different hardware, display resolution, and/or a different level of authorization. So, a service collection allows a client to react to current client conditions by actuating alternative content and display techniques from the bundle if, for example, conditions do not allow display of "first choice" content or display mode.

Another benefit of using a service collection for the acquisition data 204 is that multiple services—even services of different media types—an be received and rendered simultaneously, i.e., combined. As multimedia devices become more generic and less tied to a particular codec or delivery method, service providers and clients may wish to combine entirely different service types into a coherent presentation. For example, one type of application can display a slide show of pictures that have been downloaded over the Internet, while at the same time playing content from an Internet radio station. In addition to displaying multiple service types simultaneously, the client may wish to use different service types for the authorized and unauthorized versions of the same piece of content. For example, a VOD movie may simply use the promotional poster encoded as a static image, as the preview service. There are a myriad of other interesting ways to render multimedia content using a service collection that conventional techniques cannot do.

If a service collection is used as the acquisition data 204, then a services map 208 may also be included in the exemplary multimedia system 100 in order to link services to their respective subsystems.

MediaDescription Data Structure

Figure 3:
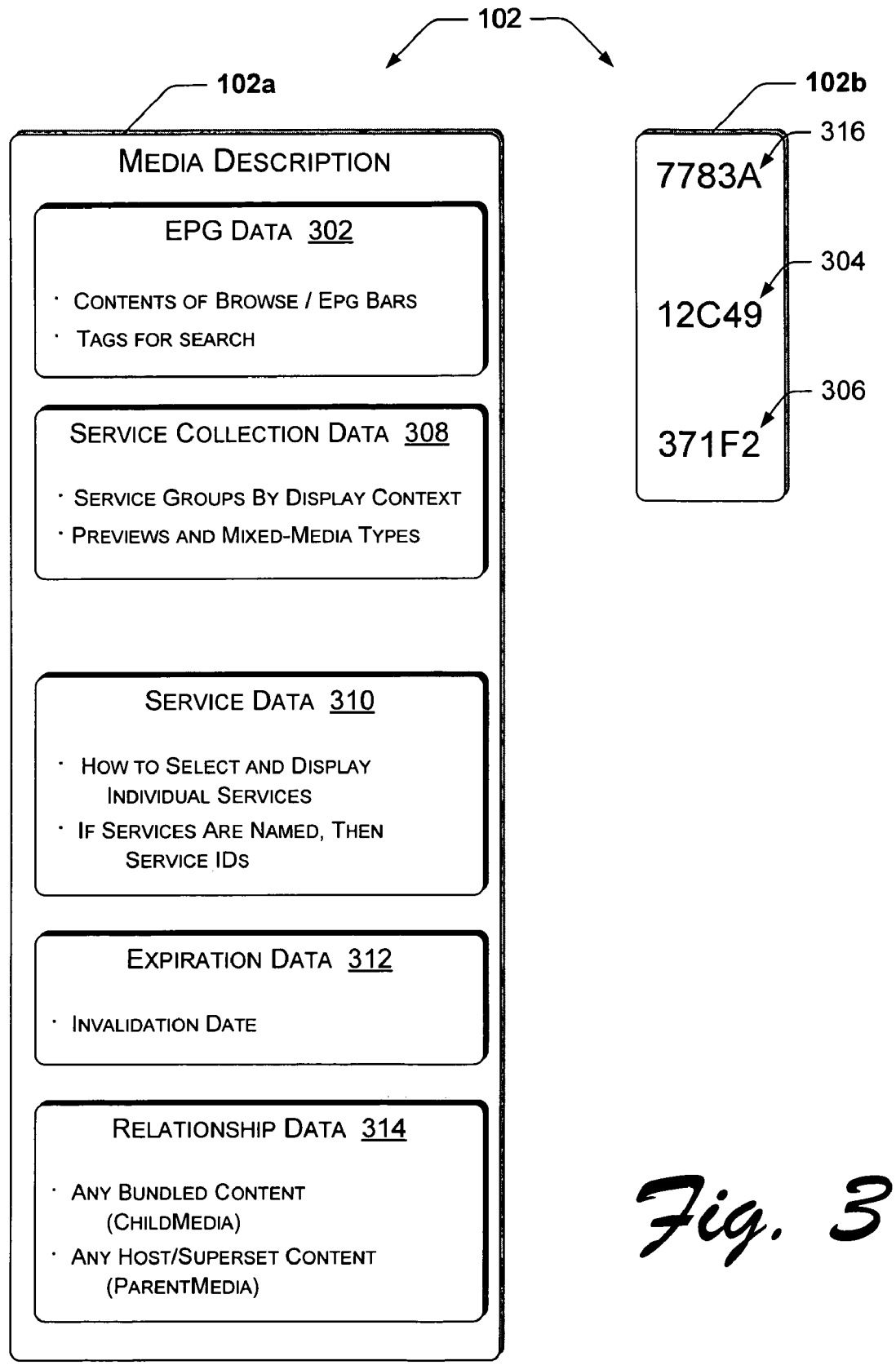
FIG. 3 is diagrammatic representation of exemplary MediaDescription data structures.

FIG. 3 shows exemplary data structures of two MediaDescription variations, 102a and 102b. Each carries several types of descriptive and acquisition information about its associated program in a single data package that has a "universal" format ("universal" here meaning that the MediaDescription 102 is usable with diverse services that can provide diverse types of multimedia content; and with diversely created EPG data). Each MediaDescription 102 is compact, digitally reproducible, and portable unit (i.e., transferable via conventional digital transmission).

In practice, a MediaDescription 102 data structure may be implemented in an extensible markup language (XML) format or a format of a similar language, or may be implemented partly or entirely in identifiers that point to the digital data—which data, if not self-contained in the MediaDescription 102, does not have to be in the same format as the data that is "onboard" a MediaDescription 102 in a explicit manner.

A "homemade" MediaDescription 102a is more likely to be an anonymous MediaDescription 102 because a name that uniquely refers to the content is not needed across the multimedia system. On the other hand, a MediaDescription 102b for which multiple entities have to be sure that the content referred to is the same, is given a unique name. For example, a lesser-viewed video-on-demand movie, which is not widely distributed to many consumers, but which still needs to have a unique identifier across the system, uses a named MediaDescription 102. It should be noted that an anonymous MediaDescription does not necessarily have to have explicit information within itself. An anonymous MediaDescription can have all referential content.

Except for the expiration data 312 and relationship data 314, all contents of the MediaDescription 102 (including the MediaDescription 102 itself) can be named or anonymous. Named entities are labeled with an identifier, which is then consistently used across an exemplary multimedia system 100 (this may be useful for applications such as digital rights management/content protection). In brief, when an identifier is used the content of such a named entity may be left out of the MediaDescription 102b. But the data of anonymous entities are self-contained in the MediaDescription 102a, and therefore must be completely described.

A "media descriptor" 316 is a single identifier or tag that refers to an entire MediaDescription (102a or 102b). Thus, if two components in an exemplary multimedia system 100 have a shared understanding of a particular MediaDescription's identity, instead of having to send around the entire MediaDescription 102, including any explicit XML, the components can simply send the identifier that names the MediaDescription 102.

First among types of information carried, a compressed form of a MediaDescription 102 may include a link 304 or pointer to descriptive metadata (e.g., EPG data) about the program, or, may include the listing itself 302 (e.g., the actual EPG data), including contents of browse bars, EPG bars, and tags for the program or the EPG data—for the purpose of being found in a search.

Second, the MediaDescription 102 may include a link 306 to the information about how to acquire the program content, i.e., the acquisition data 308. An anonymous MediaDescription 102 may include the acquisition data 308 itself 308, for example in the form of a service collection, as described above. A service collection can have services of different media types grouped for potential simultaneous use according to potential display contexts. The services, in turn may have pointers to subsystems. Thus, the acquisition data 308, e.g., a service collection, may be more sophisticated than just a simple link to the content item.

In a service collection, the actual content item(s) (or more precisely, services) delivered, while being one or more proper objects of an acquisition executed by the acquisition data 308, may yet vary because contents and/or services to be delivered are tuned to current client conditions, such as available hardware and available permissions to view one or more simultaneous content items. As an example of how a service collection works, if the client has satisfactory equipment and proper permissions, the client may receive services that have been predetermined for a "primary fullscreen" presentation of the requested content item—a preferred package of services. Lacking permissions, the client may receive instead a preview or just a poster. If the client only has a cell phone display, the client may automatically receive a secondary tier presentation of the content, etc.

In addition to the two primary capacities described immediately above, a MediaDescription 102 may optionally include several other types of information. For example, a MediaDescription 102 may include service data 310 that tells a client device how to present content from various services. In addition, a MediaDescription 102 may include expiration data 312 that indicates to a multimedia system 100 or client device 106 when the MediaDescription 102 will no longer be valid. Further, a MediaDescription 102 may also include relationship information 314 that indicates how the content relates to other pieces of content (e.g., a single TV episode may have a MediaDescription 102 that has a "child" relationship to a MediaDescription 102 for the "parent" TV series, and borrows descriptive attributes from the parent).

Thus, a MediaDescription 102 data structure, e.g., in XML, provides a very general and adaptable schema—a universal vehicle—for allowing a client to acquire a program and its related listing information across a wide variety of media types, including non-service-provider media types that are Internet-mediated. For example, the homemade slideshow available via a URL from the example described above can be acquired just as easily as the latest Hollywood movie from a commercial service provider. Thus, a MediaDescription 102 is a relatively self-contained universal carrier of information used to describe, acquire, and present a piece of multimedia content—that can be used across different platforms, across client types, across multimedia program types, and across service types.

Since a MediaDescription 102 data structure is compact, portable, and exists as a separate entity from the program it describes and enables, a MediaDescription 102 comprises a type of token that allows a client to procure and execute the associated multimedia program. Thus, MediaDescriptions 102 can be used as a generic vehicle for acquiring many different types of multimedia contents and attaching relevant EPG data. MediaDescriptions 102 and can be exchanged between multimedia consumers without involving the central commercial service provider, analogous to the manner in which Web publishing, rather than book publishing, allows peers and multiple commercial providers to exchange content without going through a central clearinghouse. This is different from conventional multimedia models.

The flexibility and extensibility of an exemplary multimedia system 100 that uses MediaDescriptions 102 is further enhanced by another feature of naming each MediaDescription 102 with an identifier, such as a globally unique identifier (e.g., a GUID), referred to herein as a "media descriptor" 316. In such a system, the liquidity of content exchange and EPG data transfer is further increased because the transfer of a media descriptor 316, e.g., a single name or number, can enable a wide variety of different clients to access a MediaDescription 102 in a very compact form.

In another comparison, the data structure of a MediaDescription 102 enables the MediaDescription 102 to function much like a card in a conventional "library card catalogue." A card in a card-catalogue contains metadata about a piece of content and information on how to recover the piece of content itself (e.g., from a library shelf, using Dewey decimal number, etc.). Likewise, a MediaDescription 102 contains metadata relating to a piece of content, as well as instructions for recovering that piece of content. Similar to the manner in which a card in a card catalogue can refer to different types of media (magazines, books, recordings, encyclopedias) a MediaDescription 102 can refer to different media types.

However, a MediaDescription 102 is more than just an electronic version of a catalogue card. As will be discussed further below, an exemplary multimedia system 100 using MediaDescriptions 102 can provision multiple service tiers of content via the above-described "service collection" mechanism.

An exemplary multimedia system 100 using MediaDescriptions 102 can also associate different MediaDescriptions 102 with each other in a relationship system that can be stored as part of a MediaDescription data structure. Thus, a group of MediaDescriptions 102 can carry within their own structure a collective network or hierarchy between themselves. This same data structure can be used for packing—aggregating—search results.

MediaDescriptions 102 can be created and used in several ways. In one implementation that uses an implicit manner of creation, each content item that is provisioned in a default channel map 202 can have an associated MediaDescription 102 created for it, by default, as a routine matter of course.

In one implementation that uses an explicit manner of creation, a VOD storefront can fashion and/or provide a MediaDescription 102 to allow a client to tune in a content item that has been purchased. Such a system can also use named MediaDescriptions 102*b* to track which VOD content a user has purchased. DVR recordings created on a local client device 106 may also be stored with a MediaDescription 102*a* created at the time of the recording.

In an inferred manner of creation, a client may create a MediaDescription 102*a* from some base data (for example, the URL of a WINDOWS® MEDIA® 9 (WM9) file in advanced systems format (ASF) on a web site, or a directory containing images for a slide show). The EPG data created by the client for the MediaDescription 102*a* may not be particularly descriptive, and if a preview capability is to be built in the MediaDescription 102*a* the preview may be generic, but the experience of a receiving client who uses the MediaDescription 102*a* will be consistent with the rest of the recipient's UI, that is, the content item will present in the usual manner of the client device 106 and the recipient's program guide will integrate the content item acquired by the MediaDescription 102*a* the same as if the MediaDescription 102*a* was received from the service provider 104.

Media Description Usage Examples

An exemplary multimedia system 100 that uses MediaDescriptions 102 is more flexible and open-ended than conventional multimedia systems. Accordingly, there are a variety of tools, methods, and implementations constructed around MediaDescriptions 102 that allow the MediaDescriptions 102 to solve various problems that arise in multimedia systems.

VOD Storefront Implementation

Figure 4:
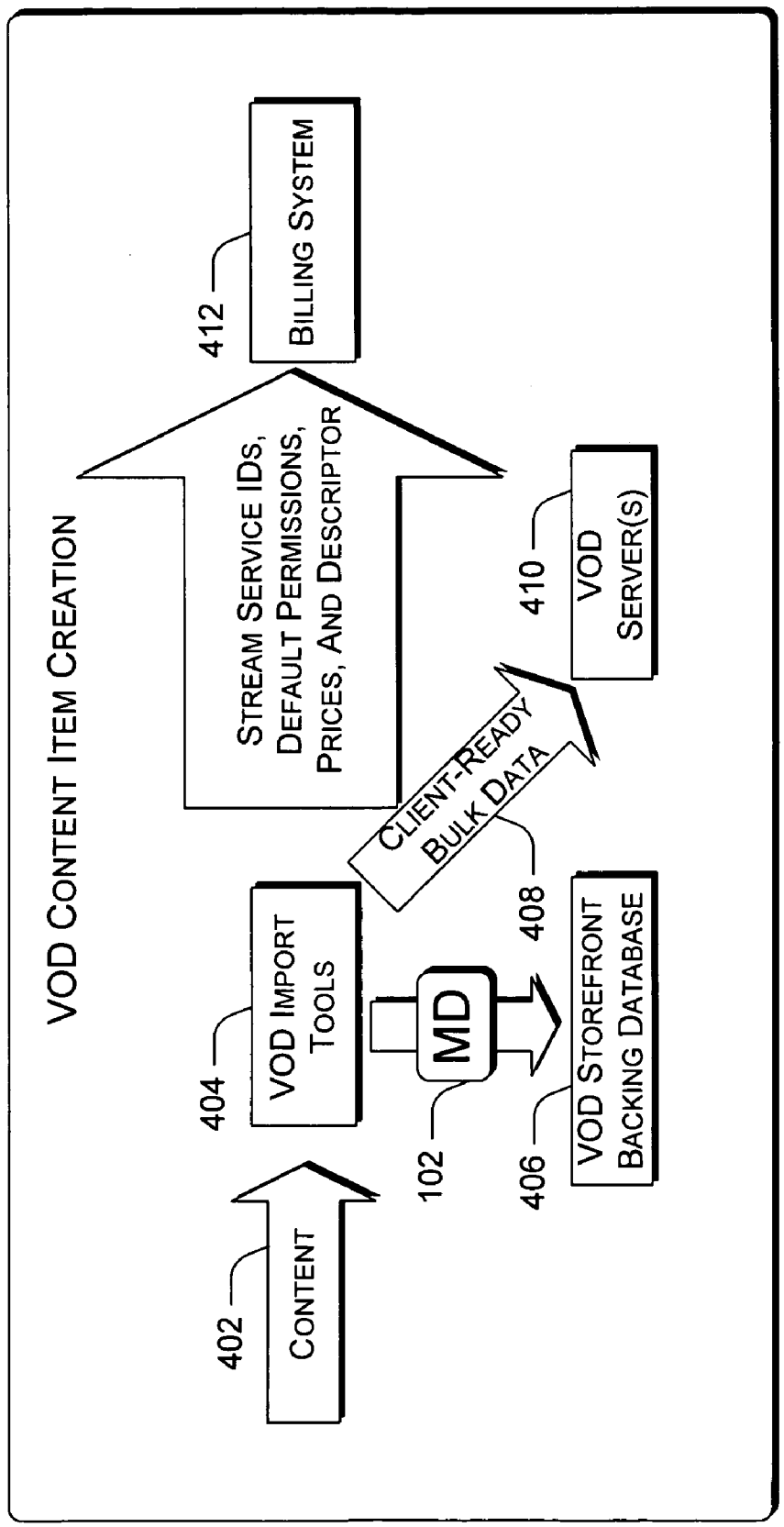
FIG. 4 is a diagrammatic representation of exemplary video-on-demand (VOD) content item creation.
Figure 5:
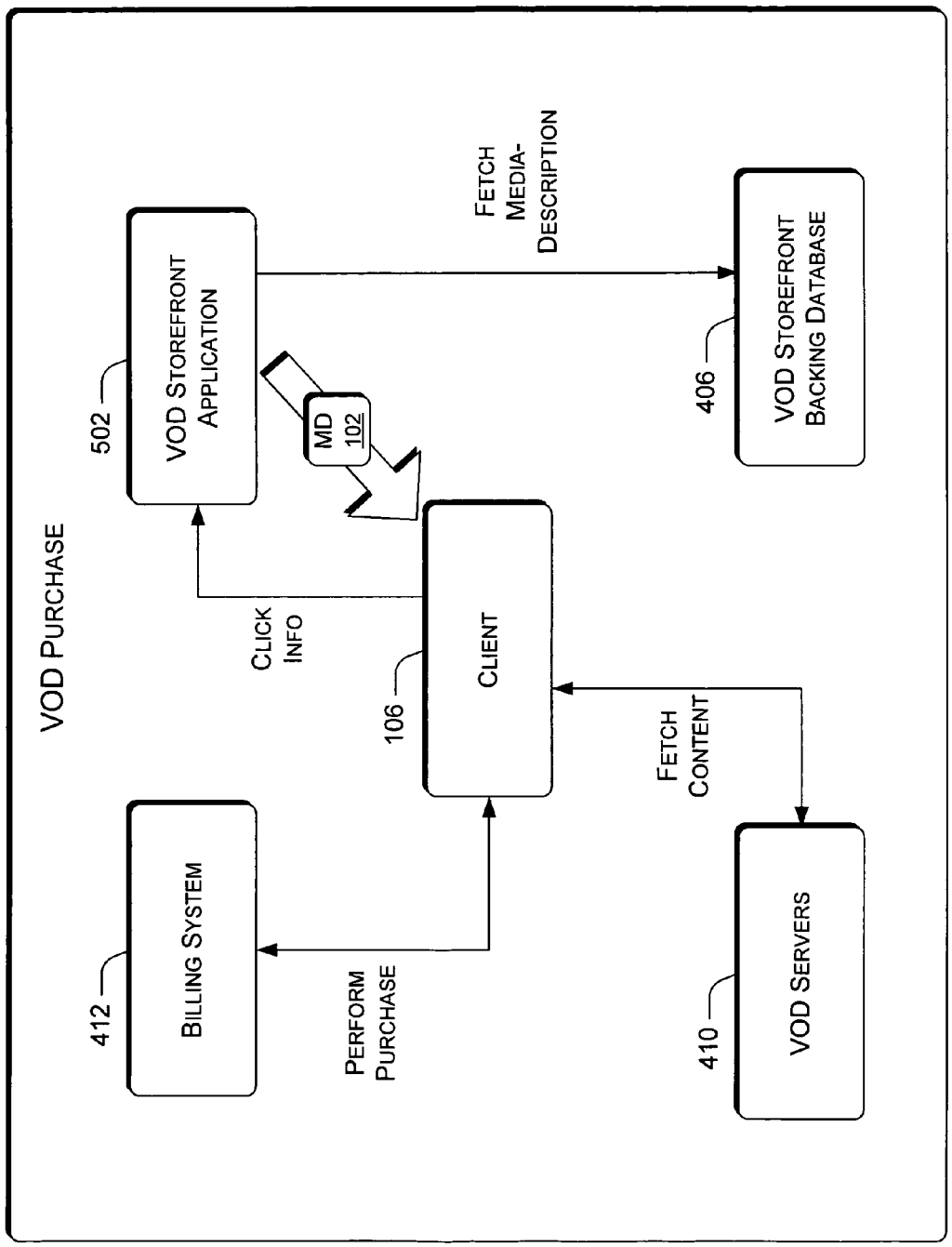
FIG. 5 is a diagrammatic representation of an exemplary VOD purchase process using MediaDescription data structures.
Figure 6:
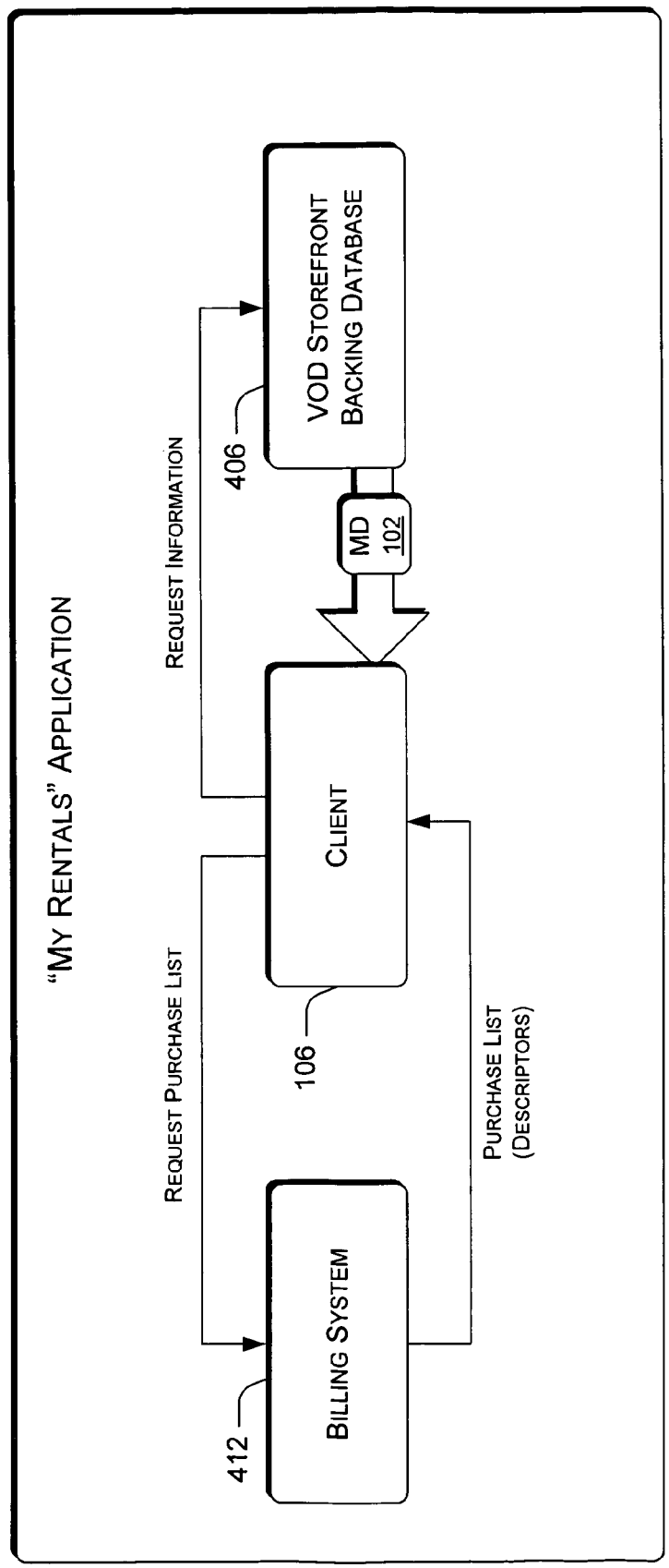
FIG. 6 is a diagrammatic representation of an exemplary billing process in a rental application using MediaDescription data structures.

FIGS. 4, 5, and 6 show a VOD storefront implementation in which less-popular content items that, in a conventional system, would rarely or never get placed into default channel maps 202 for customers, can be brought into use with ease using MediaDescriptions 102. Regarding FIG. 4, in an exemplary multimedia system 100, to make the less-popular content appear in a channel map 202 a content item 402 can be imported by VOD import tools 404, which create a MediaDescription 102 to be stored in a VOD storefront backing database 406. Client-ready bulk data 408 is stored in a VOD content server 410. The media descriptor, default permissions, prices, and purchasable permissions are sent to a billing system 412. Thus, servers, such as SI and EPG servers, may be involved in the process.

In FIG. 5, for purchase tracking, the media descriptor 316 of the MediaDescription 102 can be used, e.g., by a security server and by a VOD storefront application 502, as a tag to coordinate which content items have been purchased, allowing the client 106 to efficiently retrieve information about purchased programs.

In FIG. 6, for tracking a "last-viewed" content item, the VOD-channel application on a client 106 can configure the first entry on that channel to point to the media descriptor 316 of the last-viewed VOD MediaDescription 102. The MediaDescription 102 cannot be anonymous, because then its media descriptor 316 would not persist across reboots.

DVR Implementation

Figure 7:
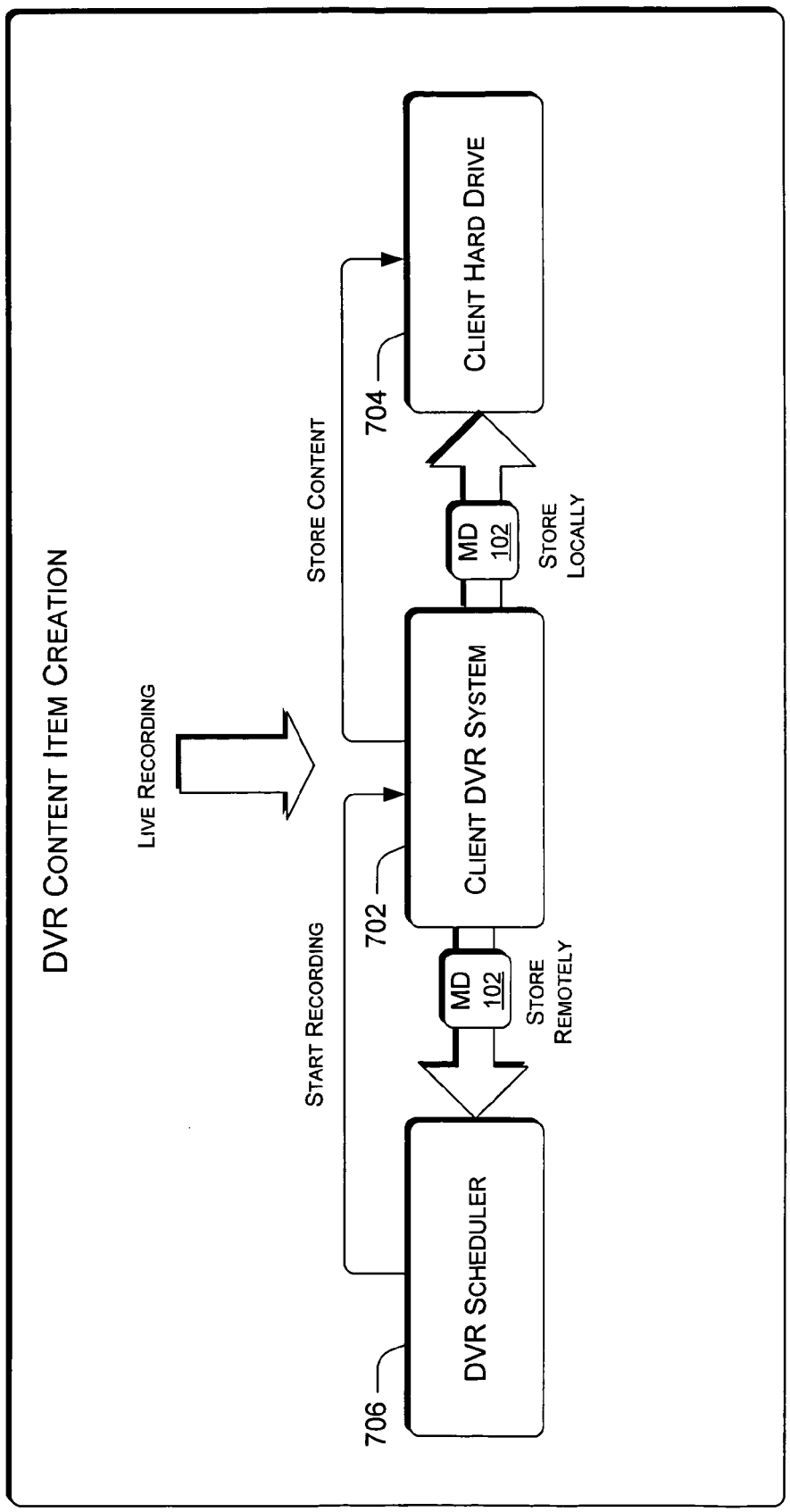
FIG. 7 is a diagrammatic representation of exemplary DVR content item creation using MediaDescription data structures.
Figure 8:
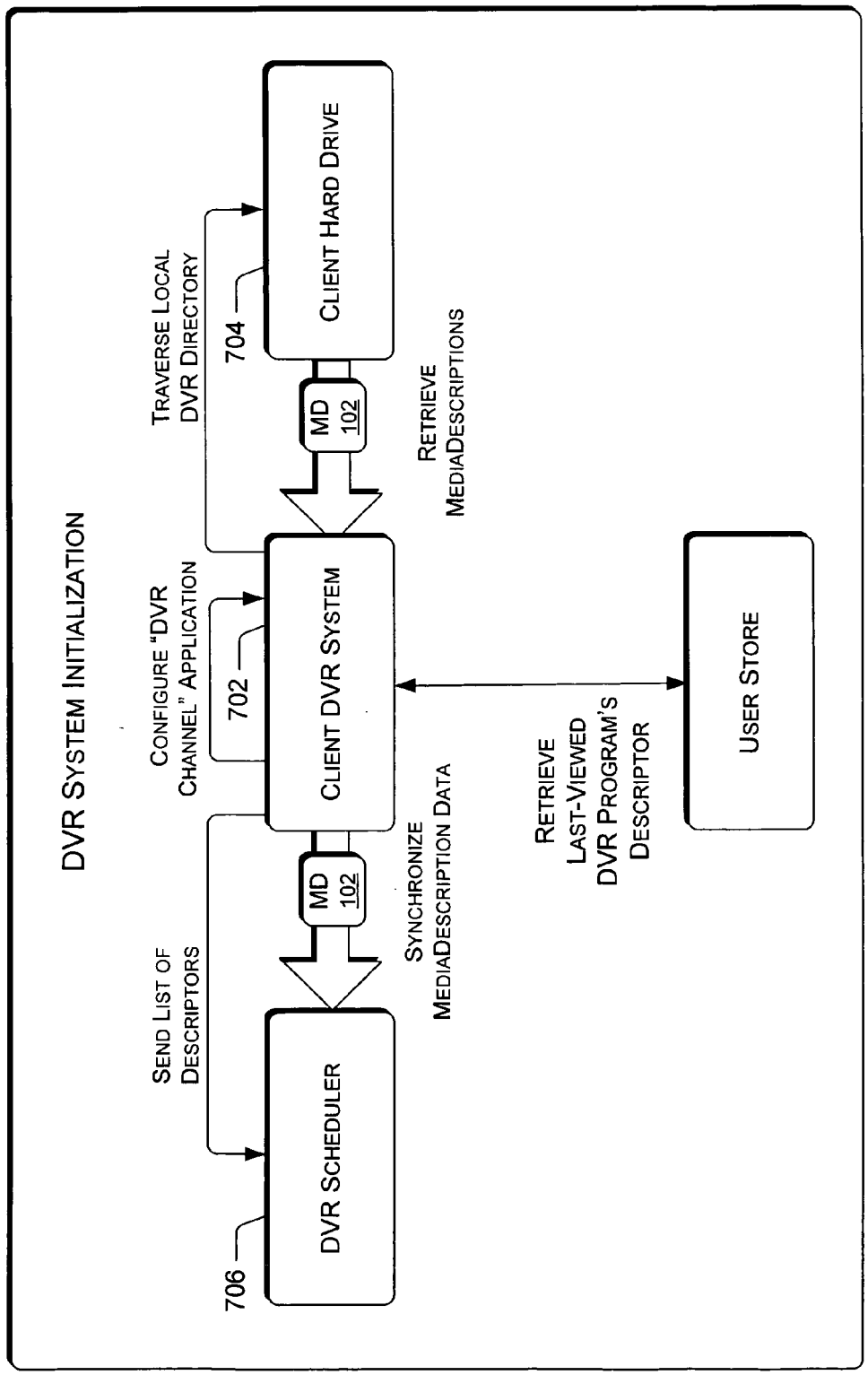
FIG. 8 is a block diagram of exemplary DVR system initialization using MediaDescription data structures.
Figure 9:
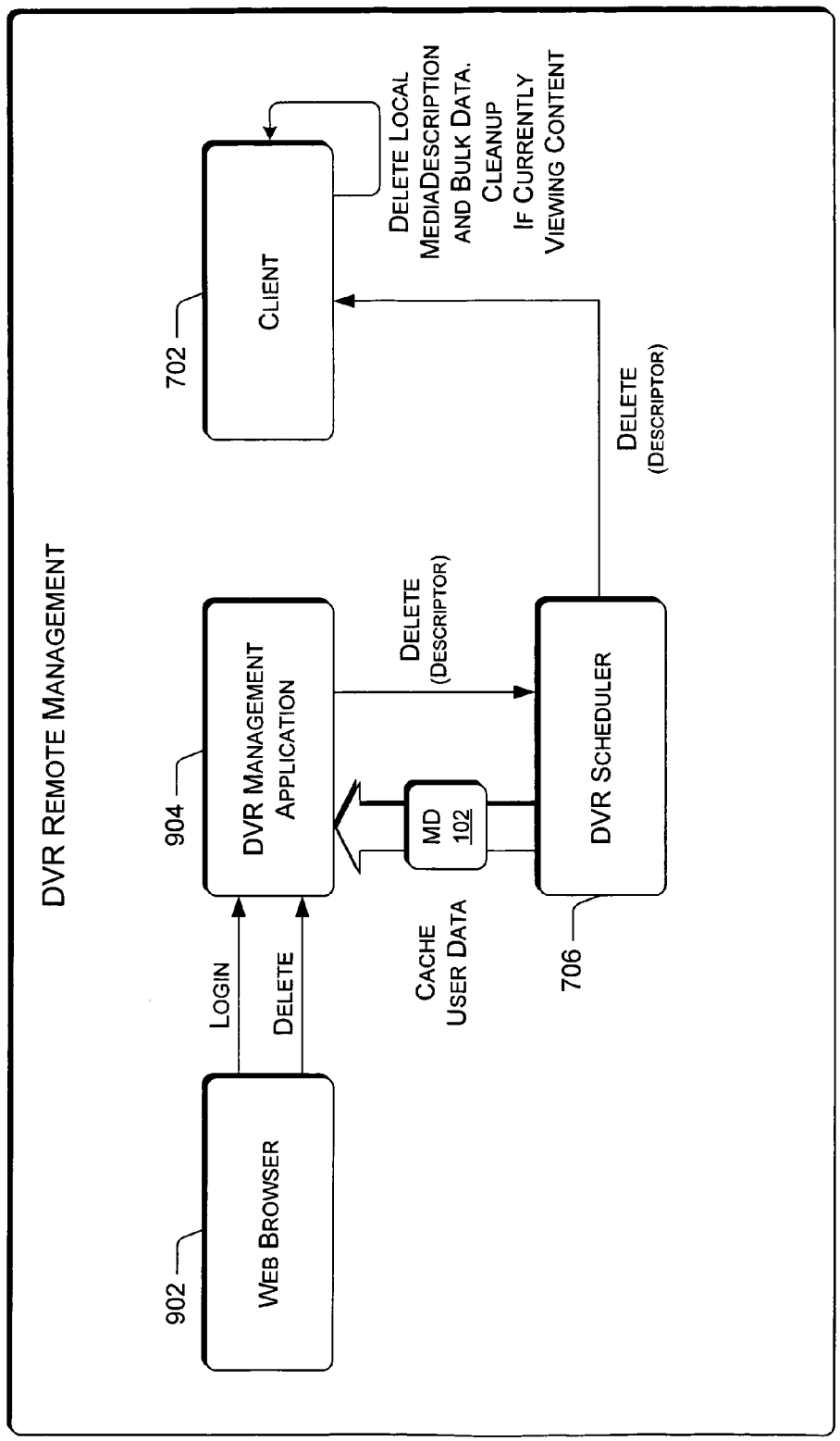
FIG. 9 is a diagrammatic representation of exemplary DVR remote management using MediaDescription data structures.

FIGS. 7, 8, and 9 show a DVR implementation using MediaDescriptions 102. As shown in FIG. 7, the client's DVR system 702 uses MediaDescriptions 102 to keep all required information about a recorded program in a single, consistent format. All relevant information about a DVR program must be stored, e.g., on client hard drive 704 and/or at a remote DVR scheduler 706, because there is no guarantee that the channel from which the program was originally recorded still exists (and therefore, the station data may have to be stored in addition to the program data). The client DVR system 702 is also able to deliver these MediaDescriptions 102 to UI code so that DVR programs can be presented in a consistent fashion with other content items.

In FIGS. 8 and 9, the client DVR system 702 and the remote server's DVR scheduler 706 also use named MediaDescriptions 102 to coordinate between themselves. In this way, in FIG. 9, an exemplary multimedia system 100 can easily implement a schema in which a remote web interface 902 can view DVR information for a client via a DVR management application 904, while the client 702 and the server that has the DVR scheduler 706 can indicate individual recorded programs with one token. These MediaDescriptions 102 are also named so that a last-viewed-DVR-program variable can be easily kept across reboots. In FIG. 8, copies of the MediaDescription 102 may be kept on the same hard drive 704 as the DVR content on the client, as well as in the server for the remote DVR scheduler 706.

Implementation for Playing Internet Content

Figure 10:
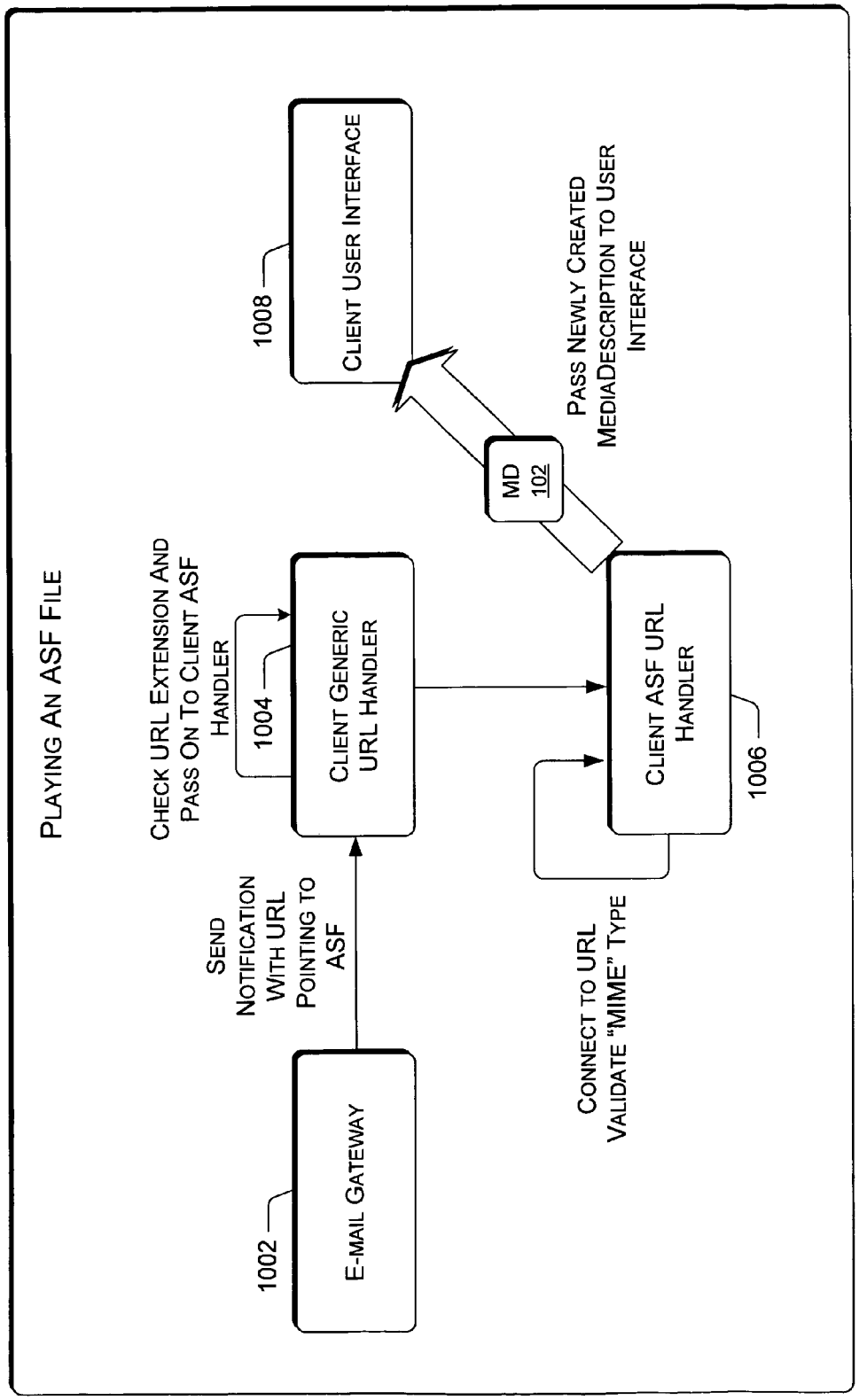
FIG. 10 is a diagrammatic representation of playing an exemplary ASF file using MediaDescription data structures.
Figure 11:
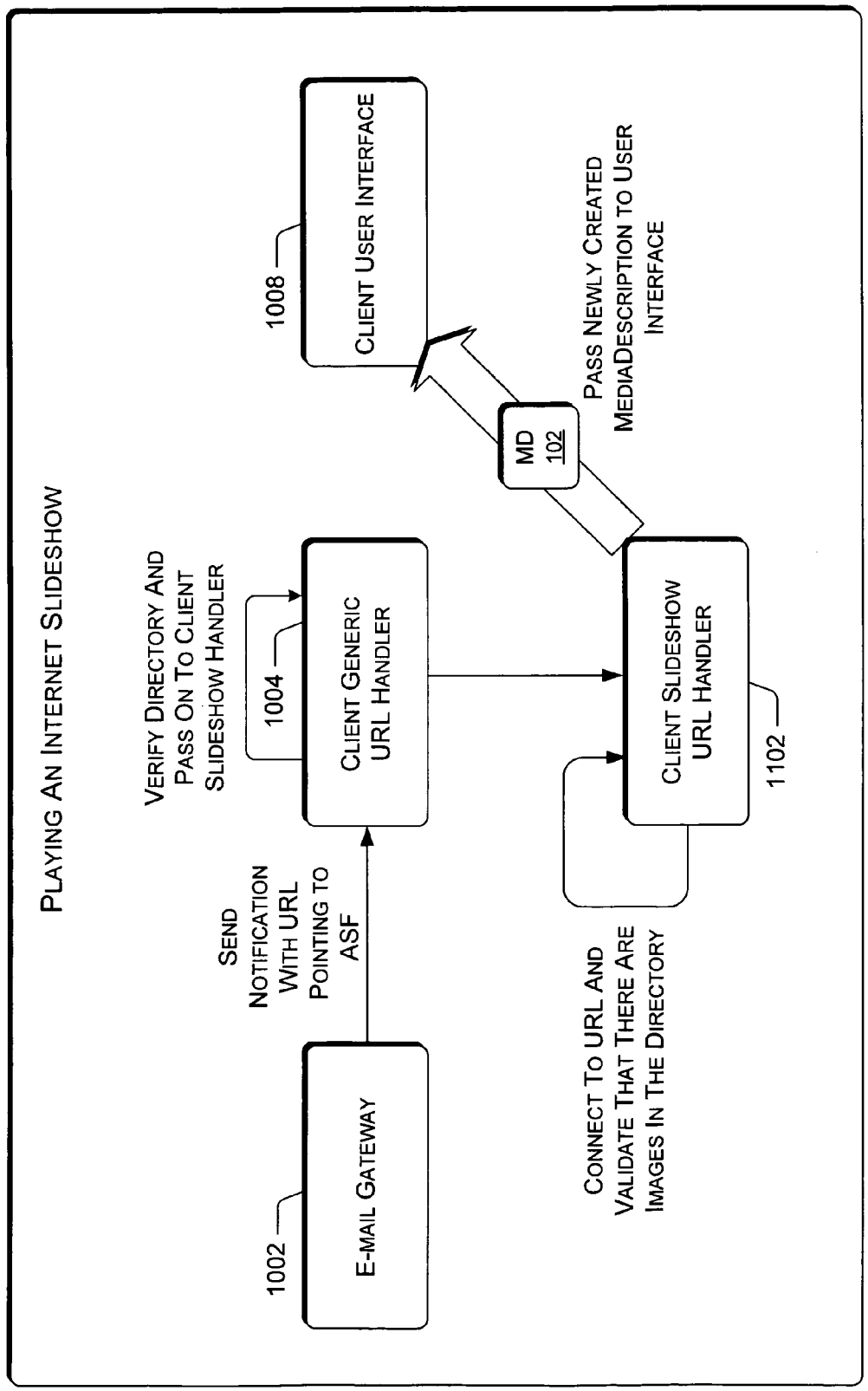
FIG. 11 is a diagrammatic representation of playing an exemplary Internet slideshow using MediaDescription data structures.
Figure 12:
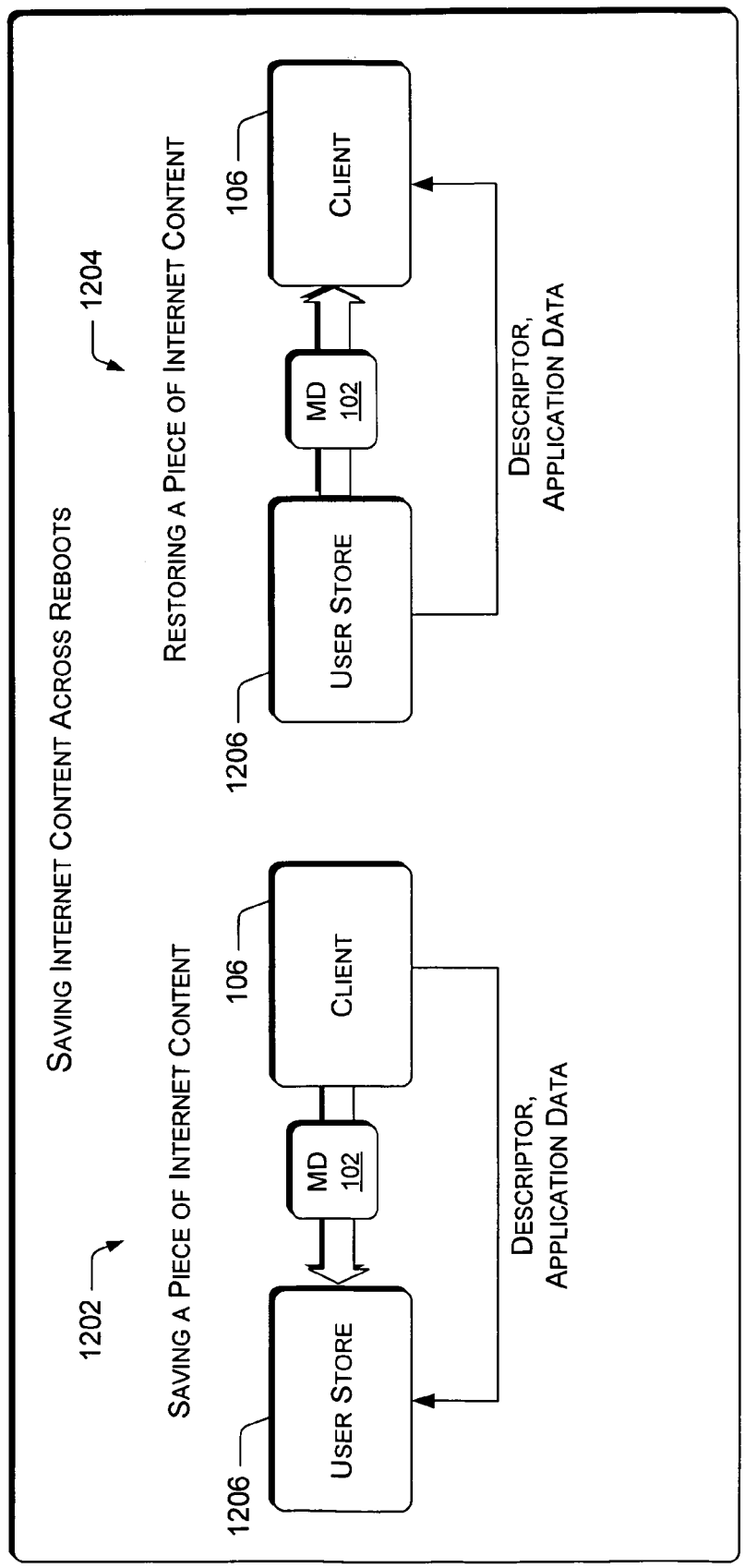
FIG. 12 is a diagrammatic representation of saving Internet content across reboots using MediaDescription data structures.

FIGS. 10, 11, and 12 show two implementations for rendering Internet content using MediaDescriptions 102. In a first implementation shown in FIG. 10, a movie in advanced systems format (ASF) of a web site is to be viewed. An email gateway 1002 may send a notification with the URL that points to the ASF movie. A generic URL handler 1004 on the client receives and checks the URL extension, and passes the URL to a handler for ASF URLs 1006 on the client. The client ASF URL handler 1006 may connect to the URL and validate the multipurpose Internet mail extension (MIME) type. If the MIME type does not match, the ASF URL handler 1006 may pass the URL back to the generic URL handler 1004. Otherwise, the ASF URL handler 1006 generates an anonymous MediaDescription 102 for use by the client UI 1008. If, for some reason, it is desirable to have the Internet content persist across reboots (perhaps for a "last viewed movie" application), the client may choose to name the MediaDescription 102, to be stored in the user data store.

If an exemplary multimedia system 100 using the above schema uses service collections (as described above) as the acquisition data 308 in MediaDescriptions 102, then in one example implementation, only the "fullscreen primary" member of the service collection (i.e., the preferred primary default set of services to be used, if client conditions permit) is populated with the actual data behind the URL. Data to be placed in a picture-in-picture (PIP) window can be a type-specific image, for example, and the "secondary" members of the service collection (if included at all) can be generic error messages, for example.

If service collections are used and none of the predefined display types match the content, the generic URL handler 1004 may refuse to parse the data, or may choose to display the destination as text on the screen.

Associated listings data, i.e., the EPG data 302, can be created in a type-specific manner from values such as the identity of the hosting machine, the filename of the Internet content, and further data, if any, provided when the URL was initially provisioned to the client.

FIG. 11 shows an implementation for playing an Internet slideshow using MediaDescriptions 102. An Internet slideshow can be executed from a directory containing images. Thus, an email gateway 1002 may send a notification with a URL pointing to a directory, or may send a list of URLs, each of which point to an individual image file. In the first case, a generic URL handler 1004 on the client receives and checks the URL extension to see that it is a directory, and passes the URL to a slideshow handler 1102 on the client. The client slideshow handler 1102 may connect to the URL and, using FTP or another protocol, validate that there are images in the directory. In the second case, the client slideshow handler 1102 may connect to each listed URL and verify that it is an image type. If the content satisfies slideshow requirements, the client slideshow handler 1102 generates an anonymous MediaDescription 102 for use by the client UI 1008. Again, if it is desirable to have the Internet content persist across reboots (e.g., for a "last viewed slideshow" application), the client may choose to name the MediaDescription 102, to be stored in the user data store.

FIG. 12 shows saving 1202 and restoring 1204 Internet content across reboots using MediaDescriptions 102. When Internet content is to persist across reboots the client can use named MediaDescriptions 102 storable in the user data store 1206. Thus, during saving 1202, the client 106 stores a MediaDescription 102 including its media descriptor 316 and associated application data to the user store 1206. During restoring 1204, when the client 106 reaches a restoration point, the media descriptor 316 of the MediaDescription 102 of the last content being used before the reboot can be summoned by the client 106. Then the MediaDescription 102 for the most recent content can be requested and the content itself and/or EPG data 302 for the content can be re-acquired.

MediaDescription Relationships Data

Figure 13:
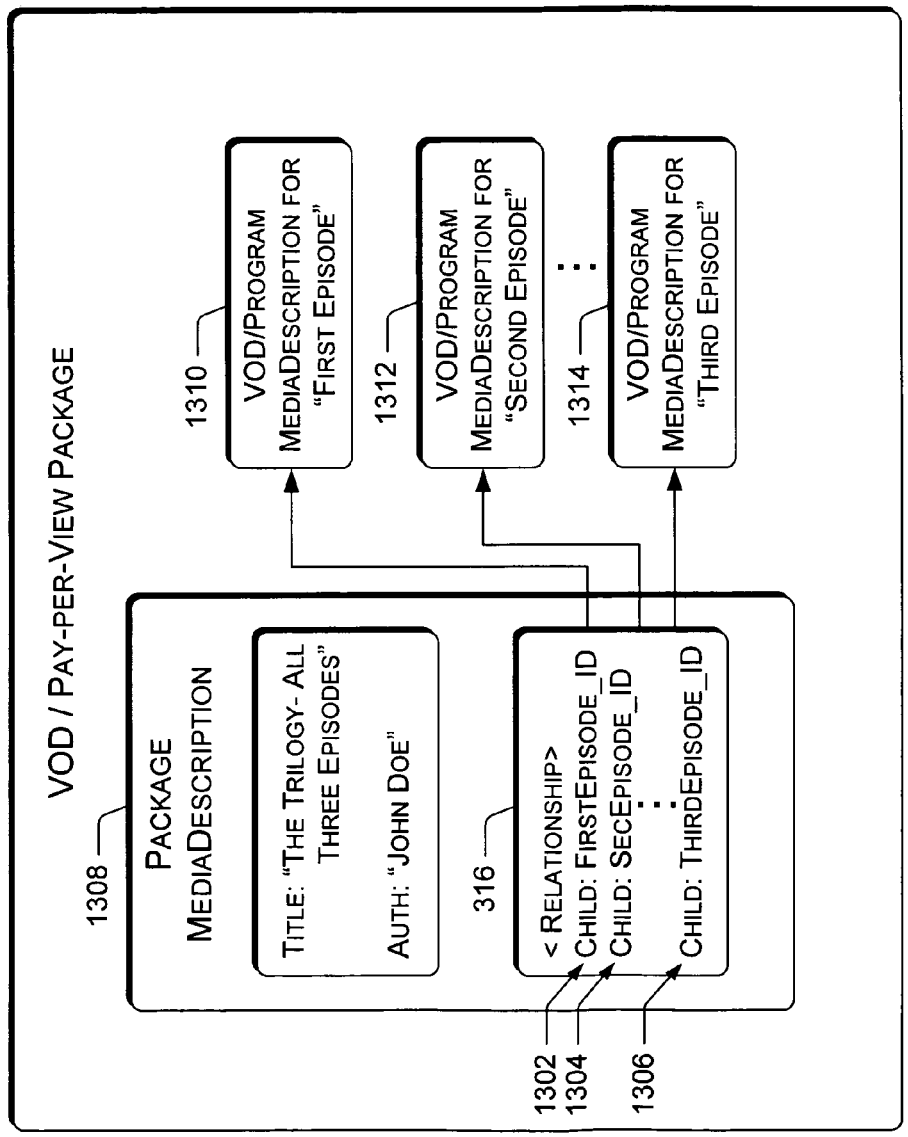
FIG. 13 is a diagrammatic representation of exemplary parent-child relationships between MediaDescription data structures in a VOD context.
Figure 14:
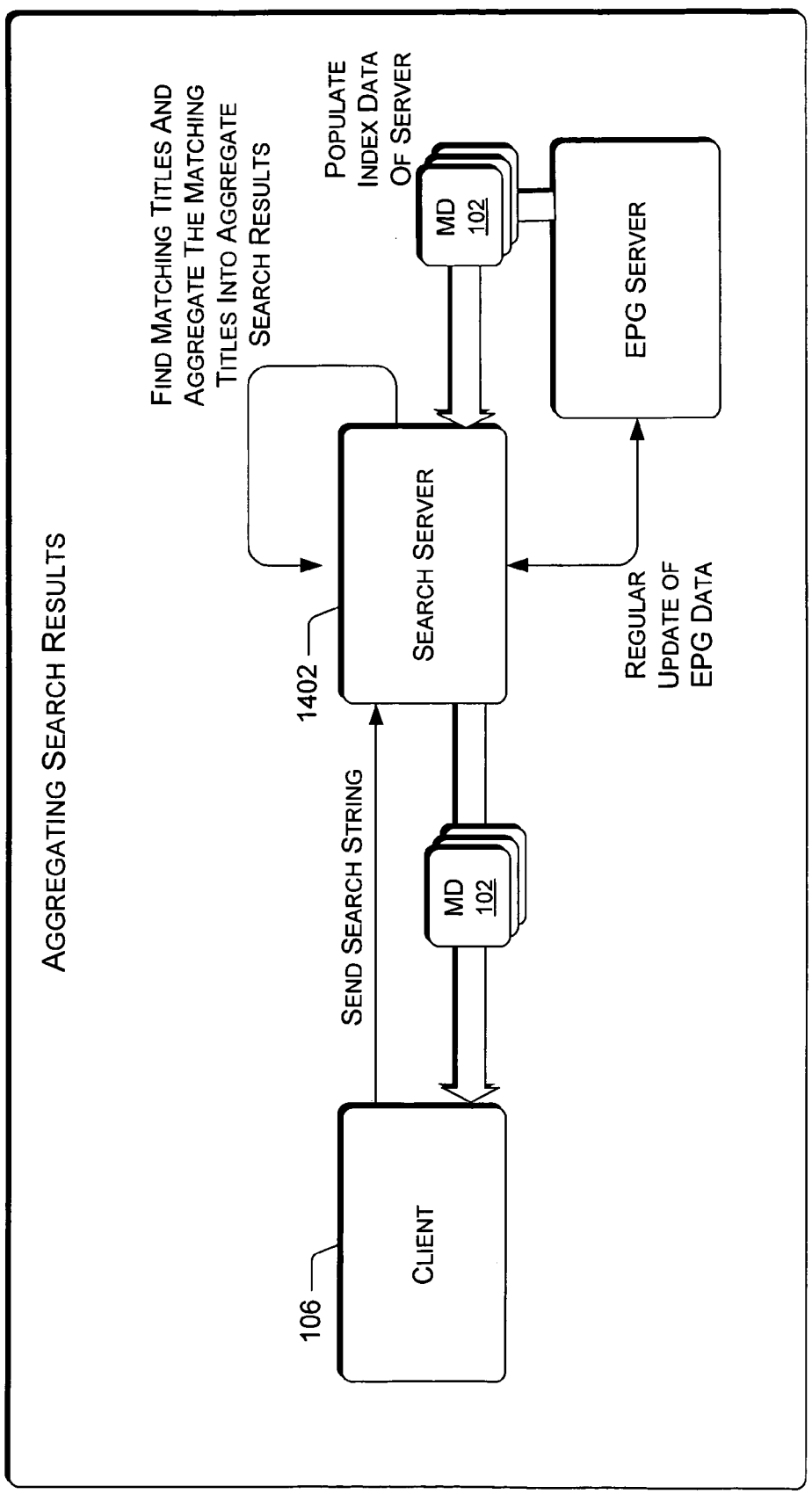
FIG. 14 is a diagrammatic representation of aggregating search results using MediaDescription data structures.
Figure 15:
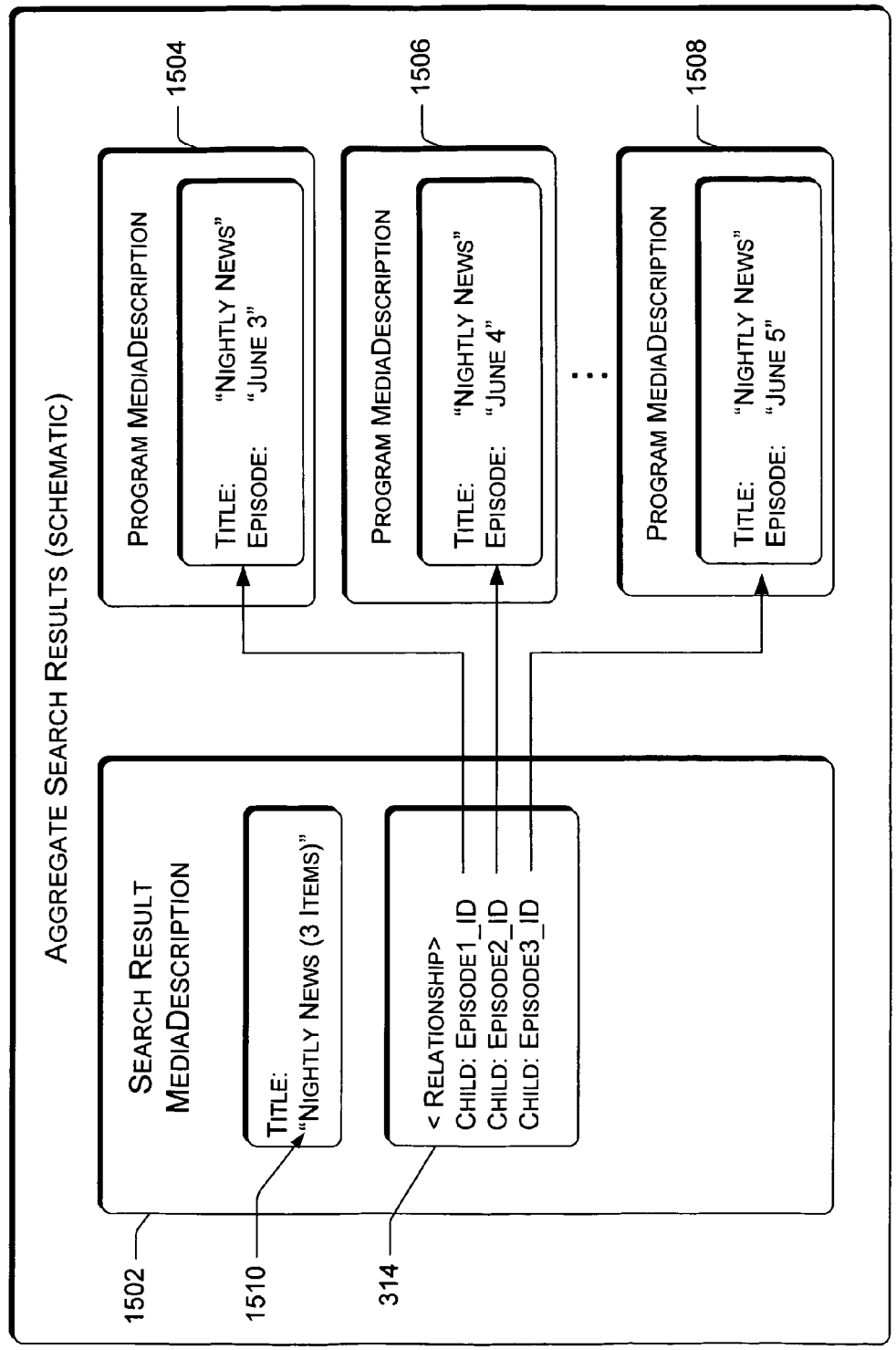
FIG. 15 is a diagrammatic representation of aggregating search results using MediaDescription data structures, in schematic form.

FIGS. 13-17 show implementations of MediaDescriptions 102 that have relationships to one another. FIGS. 13-15 emphasize child relationship data, and FIGS. 16-17 emphasize parent relationship data.

In FIG. 13, a child tag 1302 may have multiple instances (e.g., 1304, 1306) within the relationship data 314, and can be used to describe multiple pieces of content with identities to be bundled under the current MediaDescription 1308. This bundling technique can be used in several ways, for example, in multimedia searching to aggregate a large number of matches into a single line item in the listing of search results. That is, many different chapters of a single piece of multimedia content may generate a large number of search hits, but this is undesirable when the large number of hits all refer to the same singe multimedia content.

The bundling of child tags (e.g., 1302) in a single MediaDescription's relationship data 314 can also be used in VOD or pay-per-view packages, to describe all of the multiple pieces of content contained within that package. Presence of a child tag does not result in the MediaDescription 102 having no service collection and service data; rather, a generic service collection can be created for controlling aggregate search results.

FIG. 13 shows a VOD or a pay-per-view package implementation using MediaDescriptions 1308. The MediaDescription 1308 for the VOD or pay-per-view package may be acquired in any way desired (for example, it may be assigned to an element in the program guide, delivered from the VOD storefront, or sent directly as a promotion). Importantly, descriptive data 302 from the MediaDescription 1308 can be represented as a single content item in the client UI and should therefore have suitable listings and service collection data 308 (the service collection may just be a set of different sized images to select from for display, or may be a video clip specially referring to this package content item). In summary, a MediaDescription 1308 that includes child relationship data (e.g., 1302) is a single entity that represents multiple other entities, i.e., "child" content items.

FIG. 14 shows aggregation of search results using the child relationship aspect of MediaDescriptions 1308. A search server 1402 returns a series of MediaDescriptions 1308, some of which are labeled as for display, others of which are held in reserve to back up the displayed search return values. For example, if the client 106 receives back a search description saying "The Gourmet Cooking Series Show (30 items)," then the MediaDescription 1308 represents an aggregate search result, which will be displayed as a single line item in the search results list. In actuality, the search results also include the 30 individual episodes of the Cooking Series results, but marked as not for current display. In one implementation, when a user clicks on the aggregate search result, the client can then refer to the related MediaDescriptions (1310, 1312, ... 1314) and be presented with more specific EPG data 302 for each episode and also acquire each episode, if desired.

It should be noted that MediaDescriptions 102 can also be used as a way to populate the index data of the search server 1402. That is, MediaDescriptions 102 can be used as the basic informational building blocks whenever program metadata is in play, including MediaDescriptions (e.g., 1310) that have a child relationship with other MediaDescriptions 1308.

FIG. 15 shows aggregation of search results schematically, using the child tags (e.g., 1302) described above. In an example search, an aggregate search that returns a large number of hits (e.g., 1504, 1506, 1508) is displayed to the user as the single caption, "Nightly News (3 items)" 1510. This display of EPG metadata 302 for the aggregate "Nightly News (3 items)" single line result 1510 is obtained by finding whatever is common between all the large number of hits and creating the single "Nightly News (3 items)" caption as part of the "search-result" MediaDescription's EPG data 302. The relationship data 314 contains the media descriptors 316 for the individual results, which can be accessed via these media descriptors 316 to obtain more detail, as needed. One feature worth noting is that the content items returned do not have to be of the same media type. Thus, a VOD content item entitled "Nightly News" could be returned along with "Nightly News" content items from the daily stream of programming provided by a commercial service provider 104.

Figure 16:
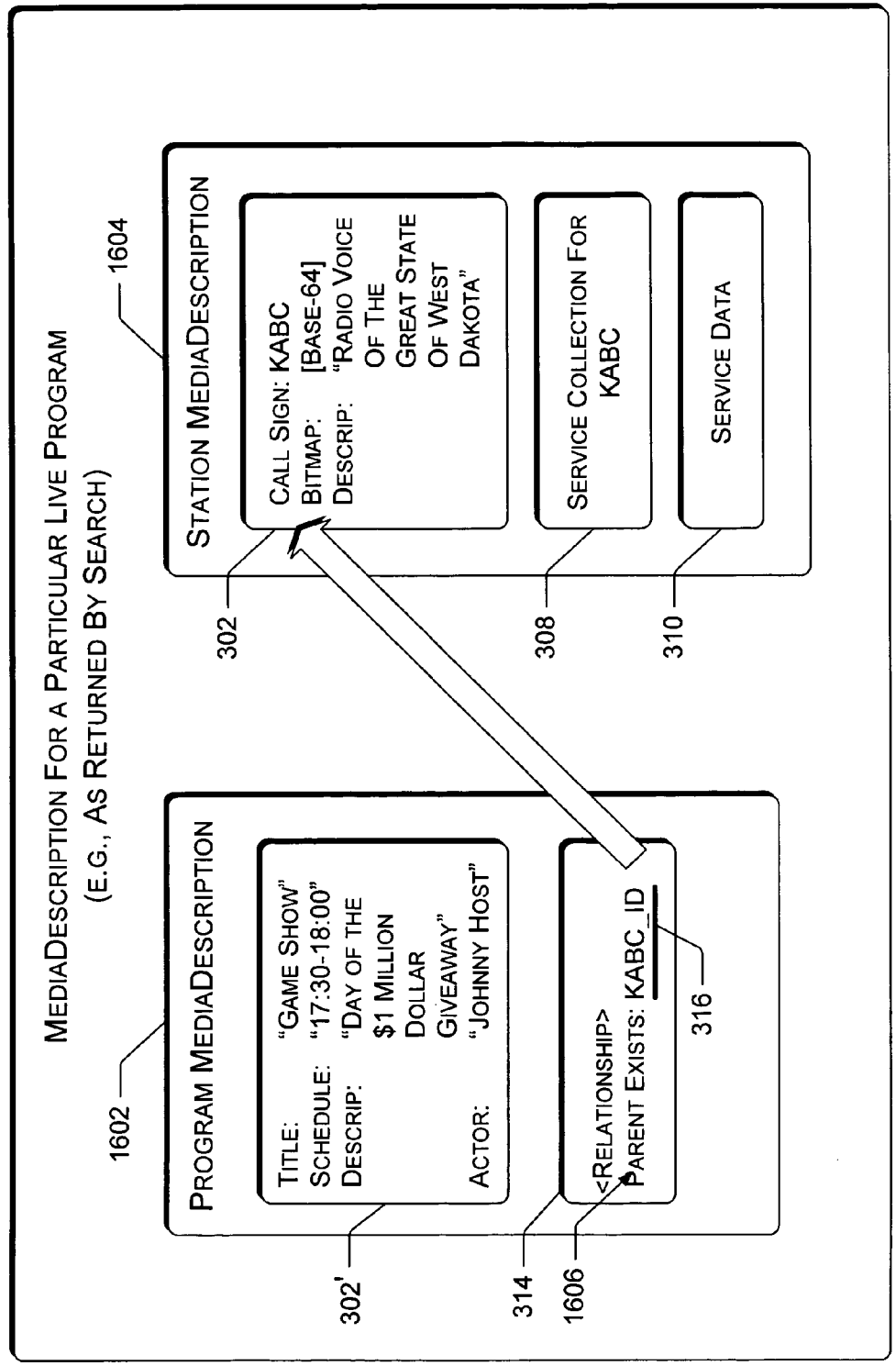
FIG. 16 is a diagrammatic representation of an exemplary parent-child MediaDescription relationship in a search results context.

FIG. 16 shows how a first MediaDescription 1602 can supplement its EPG data 302' with the EPG data 302 of another MediaDescription 1604, using the parent relationship aspect of MediaDescriptions 1604. A parent tag 1606 can be used in the relationship data 314 of a child MediaDescription 1602 in a manner similar to the use of child tags, described above.

A parent tag 1606 is usually used alone in the relationship data 314 section of a child MediaDescription 1602. The parent tag can act as a lone pointer to point to a parent MediaDescription 1604 that is associated with a parent channel or content item that envelopes the child content item associated with the child MediaDescription 1604. In other words, a MediaDescription 1602 for a chapter of a movie can point to a parent MediaDescription 1604, which describes the movie as a whole. Or, a MediaDescription 1602 for a single broadcast can point to a parent MediaDescription 1604, which describes the channel as a whole. The corresponding parent MediaDescription 1604 may or may not have the child listed. While this is often desirable, there are cases (such as MediaDescriptions for a live TV channel) where listing every possible child MediaDescription is inefficient. For example, a live TV channel does not necessarily want to list every upcoming program as a separate "child," even though those individual programs could be returned as a separate MediaDescriptions (as is the case for aggregated search results).

Using parent tags can save data space and avoid some complexity in an exemplary multimedia system 100. For example, a particular program or single broadcast on a live channel may be described in an abbreviated MediaDescription 1602 that has just a minimum of descriptive and scheduling data specific to the single broadcast. Such a MediaDescription 1602 omits a service collection 308 and service data 310, but instead uses the parent tag 1606, including a media descriptor 316 of the parent MediaDescription 1604, to access EPG data 302, service collection data 308, and service data 310 of the parent MediaDescription 1604. Thus, instead of redundantly placing the same general descriptive information for an overall channel repeatedly into each child MediaDescription 1602, each abbreviated child simply points to the parent MediaDescription 1604 for general metadata, such as EPG data 302 related to the channel in general, and for a service collection 308 and service data 310.

In the case of a multimedia search, a parent "broadcast station" MediaDescription 1604 is generally returned in line with individual program MediaDescriptions (e.g., 1602). However, unlike a case in which a broadcast station MediaDescription 1604 is downloaded for general use in a program guide, the broadcast station MediaDescription 1604 returned in the search does not include any additional scheduling or program guide data, just skeletal "always true" data such as the call sign and bitmap.

Figure 17:
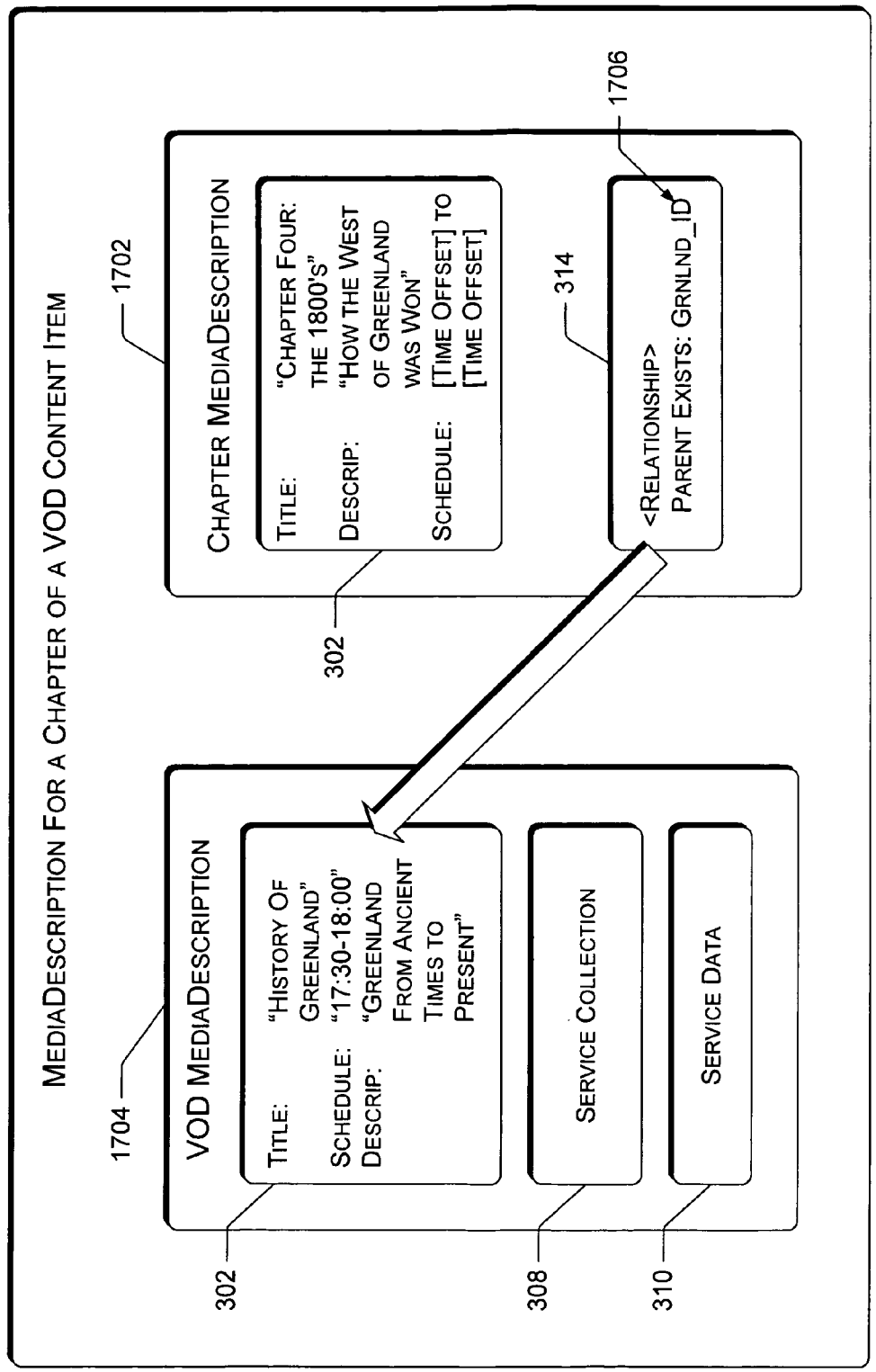
FIG. 17 is a diagrammatic representation of an exemplary parent-child MediaDescription relationship in VOD segment context.

In FIG. 17, the parent relationship aspect may be used for describing chapters or other segments of content items, such as VOD movies, referring one episode of a series to its season, etc. A child MediaDescription 1702 with a parent tag 1706 may not have a service collection 308 and service data 310. In this case, as described above, the service collection 308 and service data 310 are used from the parent MediaDescription 1704. A MediaDescription 1702 that relies on a parent MediaDescription 1704 for some of its data, however, may have a fully developed schedule description in order to give starting and ending times that are offsets of a starting time from the parent MediaDescription 1704.

Exemplary Method

Figure 18:
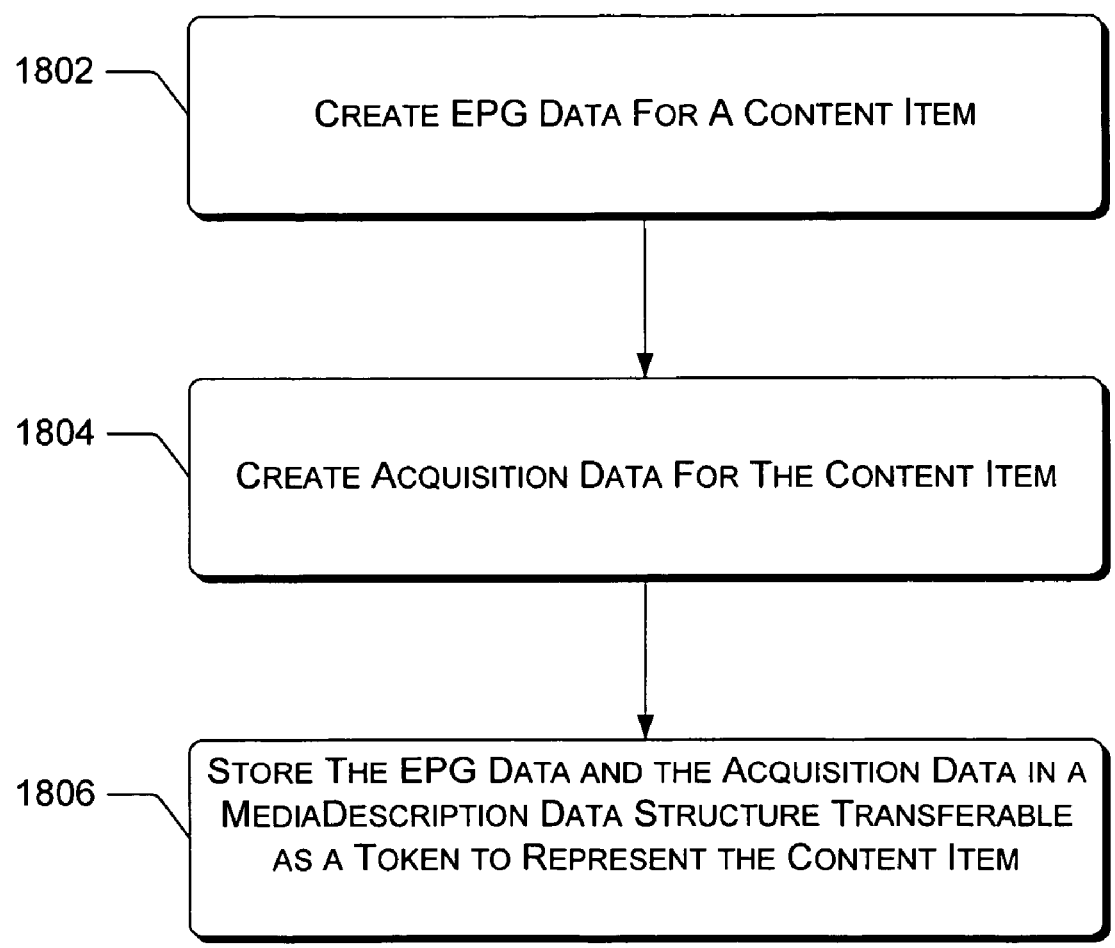
FIG. 18 is a flow diagram of an exemplary method of creating an exemplary MediaDescription data structure.

FIG. 18 shows an exemplary method 1800 of creating an exemplary MediaDescription data structure. In the flow diagram, the operations are summarized in individual blocks. The exemplary method 1800 may be performed by hardware, software, or combinations of both, for example, by a component of a multimedia system 100.

At block 1802, EPG information is created for a multimedia content item. The EPG information, such as title, description, schedule, actors, producers, credits, etc., may by created by a client of a multimedia system or by a commercial service provider of the multimedia system, or even by a process in the multimedia system that handles content items.

At block 1804, acquisition information is created for the multimedia content item. In one implementation, the acquisition information is a relatively simple link to the content item to be acquired by a multimedia client. In another implementation, the acquisition information can be a service collection, as described above and in the above-cited patent application.

A service collection can be a dynamic bundle of services broken into sets that are deployed conditionally. The services in a service collection can be of different service types, i.e., video, audio, slideshow, .jpeg, etc., and services that are of different service types can be combined in a set. A service collection can be accessed by being associated with a conventional channel number, or can be accessed in a number of different ways, for example, via a VOD storefront that may allow a consumer to access a service collection directly through a button on a remote controller. The various services of the same or different media types in a service collection are used and combined depending on the current conditions at a given client device, according to pre-established display contexts. Thus, a client may choose to acquire and display a first set (of services) if the client possesses one set of conditions, and may choose to acquire and display a different second set of services under a different set of client conditions, such as different hardware and/or a different level of authorization than for the first set.

At block 1806, the EPG data and the acquisition data are stored together in a data structure (assigned to the content item) that is transferable as a token for enabling recipients of the MediaDescription data structure to access the EPG information and the acquisition data. Identifying links to the EPG data and/or to the acquisition data may be used in a MediaDescription instead of the EPG data itself and/or the acquisition data itself.

MediaDescriptions can be named, as described above, with an identifier referred to as a media descriptor. A media descriptor is a token for a MediaDescription, which in turn is a token for the multimedia content item and associated EPG data that it represents.

As illustrated in the preceding Figure descriptions, a MediaDescription can be used as a token in many multimedia processes, such as digital video recording (DVR) processes, Internet content rendering processes, multimedia search processes, video-on-demand (VOD) processes, pay-per-view processes, and program guide rendering processes.

The step at block 1806 of storing EPG and acquisition information together in a data structure to make a MediaDescription can also include storing relationship data that points to other MediaDescription data structures assigned to other multimedia content items in child or parent relationships. Thus a MediaDescription representing an episode of a TV series can forego including all the general information about the parent series and instead just include a link to the MediaDescription of the parent series. Then information from the parent MediaDescription is acquired, e.g., for filling out EPG information about the child episode in a program guide. Parent-child relationships between MediaDescriptions can be used to facilitate many other multimedia tasks, such as representing parts of multiple VOD content items as a single package, and aggregating search results that all refer to the same content item as a single line item in a list of search results.

CONCLUSION

The foregoing discussion describes exemplary MediaDescription data structures for carrying listings and acquisition data in multimedia systems. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
creating descriptive metadata for a multimedia content item;
creating acquisition information for acquiring the content item, wherein the acquisition information describes information about relationships to other pieces of content items to enable receiving and rendering different service types into a coherent presentation and to aggregate a large number of search items;
presenting the content item in different view contexts, different platforms across multimedia program types and service types;
storing an access to the descriptive metadata and an access to the acquisition information in a data structure assigned to the content item;
wherein the data structure is digitally transferable as a token and a portable unit for enabling recipients of the data structure to access the descriptive metadata and the acquisition information;
wherein the data structure can autonomously carry diversely created electronic programming guide (EPG) data, and acquisition information for a single piece of content, the acquisition information is usable with diverse services that can provide diverse types of multimedia content;
wherein the token is presented in at least one of digital video recording (DVR) processes, Internet content rendering processes, multimedia search processes, video-on demand (VOD) processes, pay-per-view processes, or program guide rendering processes, includes information about relationships to other pieces of content, and provides information about how each different version of the content item is to be acquired and displayed;
providing a smooth display of arbitrary content from a source by integrating the arbitrary content with information from another source in a seamless manner; and
providing a new schema for provisioning service information to client devices that is open-ended and dealing with a present and a future proliferation of service types, different platforms, client types, and multimedia program types.

2. The method as recited in claim 1, wherein the storing comprises including the descriptive metadata itself in the data structure and including the acquisition information itself in the data structure.

3. The method as recited in claim 1, wherein the storing an access to the acquisition information further comprises storing a service collection to be the acquisition information.

4. The method as recited in claim 3, further comprising executing the acquisition information, wherein the service collection acquires the content item by determining one or more current conditions of the recipient of the data structure and providing one or more services selected in response to the current conditions.

5. The method as recited in claim 4, wherein the one or more current conditions to be determined include one of an availability of a hardware to render a service or a permission to receive a service.

6. The method as recited in claim 1, further comprising the token representing the content item and the descriptive metadata to a component of a multimedia system.

7. The method as recited in claim 1, further comprising transferring the token of the content item and the descriptive metadata between clients in a multimedia system, wherein the transferring between clients bypasses service providers of the multimedia system.

8. The method as recited in claim 1, further comprising naming the data structure with a media descriptor and transferring the media descriptor as an identifier of the data structure in a multimedia system.

9. The method as recited in claim 1, further comprising presenting the token for the content item in at least one of an aggregating process for listing search results, a pay-per-view process, or a program guide rendering process.

10. The method as recited in claim 1, further comprising storing one or more instances of service data, expiration data, and relationship data in the data structure, wherein the relationship data indicates a relation of the data structure to a second data structure assigned to a second content item.

11. The method as recited in claim 10, wherein storing the relationship data includes storing a media descriptor to information stored in the second data structure.

12. The method as recited in claim 10, wherein the content item is a segment of the second content item.

13. The method as recited in claim 10, wherein the second content item is a segment of the content item.

14. The method as recited in claim 1, further comprising creating the multimedia content item, the descriptive metadata, and the acquisition information on a client device and storing the access to the descriptive metadata and the access to the acquisition information in the data structure on the client device.

15. A hard drive comprising a plurality of executable instructions which, when executed, implement a method according to claim 1.

16. A data structure stored on hardware comprising a multimedia content item that includes descriptive metadata about a content item and instructions for acquiring the multimedia content item, wherein the data structure is a MediaDescription;
   wherein instruction for acquiring the multimedia content item describes information about relationships to other pieces of content items to enable receiving and rendering different service types into a coherent presentation and to aggregate a large number of search items;
   wherein the content item is viewed in different view contexts, different platforms across multimedia program types or service types;
   wherein the data structure is digitally transferable as a token and a portable unit for enabling recipients of the data structure to access the descriptive metadata and acquisition information;
   wherein the data structure can autonomously carry diversely created electronic programming guide (EPG) data, and acquisition information for a single piece of content, the acquisition information is usable with diverse services that can provide diverse types of multimedia content;
   wherein the token is represented in at least one of digital video recording (DVR) processes, Internet content rendering processes, multimedia search processes, video-on demand (VOD) processes, pay-per-view processes, or program guide rendering processes, includes information about relationships to other pieces of content, and provides information about how each different version of the content item is to be displayed;
   wherein a smooth display occurs for arbitrary content from a source by integrating the arbitrary content with information from another source in a seamless manner; and
   wherein a new schema for provisioning service information to client devices is open ended and deals with a present and a future proliferation of service type, different platforms, client types, and multimedia program types.

17. The data structure as recited in claim 16, wherein identifiers in the MediaDescription provide links to data outside the data structure to represent a descriptive metadata part of the MediaDescription and an acquisition data part of the MediaDescription.

18. The data structure as recited in claim 16, wherein an acquisition data part of the MediaDescription comprises a service collection.

19. The data structure as recited in claim 18, wherein the service collection is capable of providing multiple sets of services, each set arranged for providing service variations to a multimedia client based on one or more conditions of the multimedia client.

20. A system, comprising:
   a hard drive configured to communicatively couple to multimedia clients;
   multimedia content items;
   an individualized MediaDescription data structure stored on the hard drive, assigned to each content item as a transferable token for representing the content item,
   wherein each MediaDescription data structure includes at least an access to descriptive metadata of the content item;
   wherein each MediaDescription data structure includes at least an access to acquisition data for obtaining the content item, the acquisition data describes information about relationships to other content items to enable receiving and rendering different service types into a coherent presentation and to aggregate a large number of search items;
   wherein the content items are presented in different view contexts, different platforms across multimedia program types and service types;
   wherein the acquisition data is capable of comprising a service collection;
   wherein the MediaDescription data structure can autonomously carry diversely created electronic programming guide (EPG) data, and acquisition data for a single piece of content, the acquisition data is usable with diverse services that can provide diverse types of multimedia content;
   wherein the transferable token is represented in at least one of digital video recording (DVR) processes, Internet content rendering processes, multimedia search processes, video-on-demand (VOD) processes, pay-per-view processes, or program guide rendering processes, includes information about relationships to other pieces of content, and provides information about how each different version of the content item is to be acquired and displayed;
   wherein a smooth display occurs for arbitrary content from a source by integrating the arbitrary content with information from another source in a seamless manner; and
   wherein a new schema for provisioning service information to client devices is open-ended and deals with a present and a future proliferation of service types, different platforms, client types, and multimedia program types.

* * * * *